(12) United States Patent  (10) Patent No.: US 8,392,473 B2
Thomson et al.  (45) Date of Patent: Mar. 5, 2013

(54) FAST HIERARCHICAL ENRICHMENT

(75) Inventors: Neil Thomson, Inverness (GB);
Grzegorz Roman Pusz, Wroclaw (PL)

(73) Assignee: Microgen Aptitude Limited (GB)

( * ) Notice: Subject to any disclaimer, the term of this patent is extended or adjusted under 35 U.S.C. 154(b) by 181 days.

(21) Appl. No.: 12/876,587

(22) Filed: Sep. 7, 2010

(65) Prior Publication Data

US 2012/0059863 A1   Mar. 8, 2012

(51) Int. Cl.
G06F 12/00 (2006.01)
G06F 17/30 (2006.01)
(52) U.S. Cl. ........................................................ 707/805
(58) Field of Classification Search .................. 707/805, 707/999.102
See application file for complete search history.

(56) References Cited

U.S. PATENT DOCUMENTS

| | | |
|---|---|---|
| 4,333,144 A | 6/1982 | Whiteside et al. |
| 4,885,684 A | 12/1989 | Austin et al. |
| 5,075,847 A | 12/1991 | Fromme |
| 5,265,249 A | 11/1993 | Kumamoto |
| 5,276,881 A | 1/1994 | Chan et al. |
| 5,301,270 A | 4/1994 | Steinberg et al. |
| 5,625,823 A | 4/1997 | Debenedictis et al. |
| 5,651,108 A | 7/1997 | Cain et al. |
| 5,748,963 A | 5/1998 | Orr |
| 5,761,656 A | 6/1998 | Ben-Shachar |
| 5,987,246 A | 11/1999 | Thomsen et al. |
| 6,002,867 A | 12/1999 | Jazdzewski |
| 6,144,984 A | 11/2000 | DeBenedictis et al. |
| 6,185,728 B1 | 2/2001 | Hejlsberg |
| 6,823,495 B1 | 11/2004 | Vedula et al. |
| 6,985,900 B2 | 1/2006 | Codd et al. |
| 2001/0034562 A1 | 10/2001 | Aumer et al. |
| 2006/0247805 A1 | 11/2006 | Thomson et al. |
| 2007/0055964 A1 | 3/2007 | Mirkazemi et al. |

FOREIGN PATENT DOCUMENTS

| | | |
|---|---|---|
| EP | 0640914 | 3/1995 |
| EP | 1686466 | 8/2006 |
| WO | 03/050677 | 6/2003 |

OTHER PUBLICATIONS

EP, European Search Report and Opinion, European Application No. 10196126.6 (Jan. 24, 2012).

PCT, International Search Report, International Application No. PCT/EP2011/064584 (Jan. 31, 2012).

Gordon, R. et al., "Oracle Fusion Middleware—Fusion Developer's Guide for Oracle Application Development Framework 11g Release 1 (11.1.1)", pp. 1-3-1-19, p. 5-12, pp. 5-34-5-38, pp. 23-6-23.14 (May 1, 2009).

(Continued)

*Primary Examiner* — Aleksandr Kerzhner

(74) *Attorney, Agent, or Firm* — Thompson Hine L.L.P.

(57) ABSTRACT

A method of generating computer instructions for creating instances of a hierarchical data format from a flat record stream, the flat record stream containing data in a flat format and containing at least some data redundancy. The method uses a computing device having at least a processor, a memory, a display device and an input device. The method includes allowing a developer to use the input device to create a graphical representation of the hierarchical data format, and allowing a developer to use the input device to create a graphical representation of a mapping between the flat format and the hierarchical format. The method further includes generating, at the processor, computer instructions which when executed on a computer cause the computer to create from the flat record stream instances of the hierarchical format, wherein the instances of the hierarchical format remove the data redundancy.

17 Claims, 55 Drawing Sheets

OTHER PUBLICATIONS

U.S. Appl. No. 12/648,617, filed May 28, 2010, Thomson et al.
U.S. Appl. No. 12/648,624, filed May 26, 2010, Thomson et al.
U.S. Appl. No. 12/648,628, filed May 19, 2010, Thomson et al.
U.S. Appl. No. 12/648,636, filed May 26, 2010, Thomson et al.
U.S. Appl. No. 12/648,641, filed May 28, 2010, Thomson et al.
U.S. Appl. No. 12/648,649, filed May 28, 2010, Thomson et al.
U.S. Appl. No. 12/648,652, filed May 18, 2010, Thomson et al.
U.S. Appl. No. 12/648,656, filed Aug. 19, 2010, Thomson et al.
U.S. Appl. No. 12/648,660, filed Jun. 4, 2010, Thomson et al.
Gurd, J.R. et al., "The Manchester Prototype Dataflow Computer," *Communications of the ACM*, vol. 28, No. 1, pp. 34-52 (Jan. 1985).
Strom, R. et al., "Poster Submission—A Visual Environment for Distributed Object-Oriented Multi-Applications," OOPSLA '92, Addendum to the Proceedings, pp. 205-206, Vancouver, British Columbia (Oct. 1992).
Linthicum, D.S., "Get the Picture with Visual Programming," *Application Development Trends*, pp. 52-58 (Feb. 1994).
Dyer, D.S., "Visualization. A Dataflow Toolkit for Visualization," *IEEE Computer Graphics and Applications*, vol. 10, No. 4, pp. 60-69 (Jul. 1990).
"Breaking the Software Development Bottleneck," AVS/Express, Advanced Visual Systems Inc. (Mar. 1994).
Veen, Arthur H., "Dataflow Machine Architecture," *ACM Computing Surveys*, vol. 18, No. 4, pp. 365-396 (Dec. 1986).

| CLIENT | |
|---|---|
| CLIENT_NAME | CLIENT_ADDRESS |
| Apple | Cupertino |
| Microsoft | Redmond | a

| PRODUCT | |
|---|---|
| PRODUCT_NAME | PRODUCT_PRICE |
| mouse | 9 |
| disk | 123 | b

| CLIENT_ORDER | | |
|---|---|---|
| ORDER_ID | ORDER_DATE | ORDER_CLIENT | c

| ORDER_ITEM | | |
|---|---|---|
| ITEM_ORDER | ITEM_PRODUCT | ITEM_QUANTITY | d

Fig.1

| CLIENT_ORDER | | |
|---|---|---|
| !ORDER_ID | ORDER_DATE | ORDER_CLIENT |
| 1 | 08.04.2010 | Apple |

| ORDER_ITEM | | |
|---|---|---|
| !ITEM_ORDER | ITEM_PRODUCT | ITEM_QUANTITY |
| 1 | disk | 7 |
| 1 | mouse | 4 |

| CLIENT | |
|---|---|
| !CLIENT_NAME | CLIENT_ADDRESS |
| Apple | Cupertino |
| Microsoft | Redmond |

| PRODUCT | |
|---|---|
| !PRODUCT_NAME | PRODUCT_PRICE |
| mouse | 9 |
| disk | 123 |

Fig. 2

CLIENT_ORDER

| !ORDER_ID | ORDER_DATE | ORDER_CLIENT |
|---|---|---|
| 1 | 08.04.2010 | Apple |
| 2 | 08.04.2010 | Microsoft |

ORDER_ITEM

| !ITEM_ORDER | !ITEM_PRODUCT | ITEM_QUANTITY |
|---|---|---|
| 1 | disk | 7 |
| 1 | mouse | 4 |
| 2 | disk | 12 |

CLIENT

| !CLIENT_NAME | CLIENT_ADDRESS |
|---|---|
| Apple | Cupertino |
| Microsoft | Redmond |

PRODUCT

| !PRODUCT_NAME | PRODUCT_PRICE |
|---|---|
| mouse | 9 |
| disk | 123 |

Fig.3

Client: Apple, Cupertino
Invoice for April 2010

Order: ID 1, made on 08.04.2010

Product: mouse, unit price: 9.00 $, quantity: 4
Product: disk, unit price: 123.00 $ quantity: 7

Order: ID 3, made on 12.04.2010

Product: disk, unit price: 123.00 $ quantity: 9

Fig.5

Client: Microsoft, Redmond
Invoice for April 2010

Order: ID 2, made on 08.04.2010

Product: disk, unit price: 123.00 $ quantity: 12

Fig.6

```
SELECT
    CLIENT.CLIENT_NAME                              as CLIENT_NAME,
    CLIENT.CLIENT_ADDRESS                           as CLIENT_ADDRESS,
    CLIENT_ORDER.ORDER_ID                           as ORDER_ID,
    to_char(CLIENT_ORDER.ORDER_DATE, 'DD.MM.YYYY')  as ORDER_DATE,
    PRODUCT.PRODUCT_NAME                            as ORDERED_PRODUCT_NAME,
    PRODUCT.PRODUCT_PRICE                           as ORDERED_PRODUCT_PRICE,
    ORDER_ITEM.ITEM_QUANTITY                        as ORDERED_PRODUCT_QUANTITY
from
    CLIENT
    INNER JOIN  CLIENT_ORDER  ON
        CLIENT_ORDER.ORDER_CLIENT = CLIENT.CLIENT_NAME
    INNER JOIN  ORDER_ITEM  ON
        ORDER_ITEM.ITEM_ORDER = CLIENT_ORDER.ORDER_ID
    INNER JOIN  PRODUCT  ON
        PRODUCT.PRODUCT_NAME = ORDER_ITEM.ITEM_PRODUCT
where
    CLIENT_ORDER.ORDER_DATE  between
        to_date ('01.04.2010','DD.MM.YYYY')  and
        to_date ('30.04.2010','DD.MM.YYYY')
```

Fig. 8

| CLIENT_NAME | CLIENT_ADDRESS | ORDER_ID | ORDER_DATE | ORDERED_PRODUCT_NAME | ORDERED_PRODUCT_PRICE | ORDERED_PRODUCT_QUANTITY |
|---|---|---|---|---|---|---|
| Apple | Cupertino | 1 | 08.04.2010 | mouse | 9 | 4 |
| Apple | Cupertino | 1 | 08.04.2010 | disk | 123 | 7 |
| Microsoft | Redmond | 2 | 08.04.2010 | disk | 123 | 12 |
| Apple | Cupertino | 3 | 12.04.2010 | disk | 123 | 9 |

Fig.9

```
SELECT
    CLIENT.CLIENT_NAME                                   as CLIENT_NAME,
    CLIENT.CLIENT_ADDRESS                                as CLIENT_ADDRESS,
    CLIENT_ORDER.ORDER_ID                                as ORDER_ID,
    to_char(CLIENT_ORDER.ORDER_DATE, 'DD.MM.YYYY')       as ORDER_DATE,
    PRODUCT.PRODUCT_NAME                                 as ORDERED_PRODUCT_NAME,
    PRODUCT.PRODUCT_PRICE                                as ORDERED_PRODUCT_PRICE,
    ORDER_ITEM.ITEM_QUANTITY                             as ORDERED_PRODUCT_QUANTITY
from
    CLIENT
    INNER JOIN  CLIENT_ORDER  ON
        CLIENT_ORDER.ORDER_CLIENT = CLIENT.CLIENT_NAME
    INNER JOIN  ORDER_ITEM  ON
        ORDER_ITEM.ITEM_ORDER = CLIENT_ORDER.ORDER_ID
    INNER JOIN  PRODUCT  ON
        PRODUCT.PRODUCT_NAME = ORDER_ITEM.ITEM_PRODUCT
where
    CLIENT_ORDER.ORDER_DATE  between
        to_date ('01.04.2010','DD.MM.YYYY')  and
        to_date ('30.04.2010','DD.MM.YYYY')
```

Fig13
(continued)

Client: Apple, Cupertino
Invoice for April 2010

Order: ID 1, made on 08.04.2010

Product: mouse, unit price: 9.00 $, quantity: 4
Product: disk, unit price: 123.00 $ quantity: 7

Order: ID 3, made on 12.04.2010

Product: disk, unit price: 123.00 $ quantity: 9

Want Apple logo on mouse? Commission 100 mice in one order.
Pay 5% less for 1000 disks.

Fig.20

| CLIENT | | | CLIENT_ORDER | | |
|---|---|---|---|---|---|
| !CLIENT_NAME | CLIENT_ADDRESS | | ! ORDER_ID | ORDER_DATE | ORDER_CLIENT |
| Apple | Cipertino | | 1 | 08.04.2010 | Apple |
| Microsoft | Redmond | | 2 | 08.04.2010 | Microsoft |
| | | | 3 | 12.04.2010 | Apple |

| PRODUCT | | | ORDER_ITEM | | |
|---|---|---|---|---|---|
| !PRODUCT_NAME | PRODUCT_PRICE | | !!ITEM_ORDER | !!ITEM_PRODUCT | ITEM_QUANTITY |
| mouse | 9 | | 1 | disk | 7 |
| disk | 123 | | 1 | mouse | 4 |
| | | | 2 | disk | 12 |
| | | | 3 | disk | 9 |

| MESSAGE | |
|---|---|
| MSG_RECIPIENT | MSG_TEXT |
| Apple | Want Apple logo... |
| Apple | Pay 5% less for... |

Fig.21

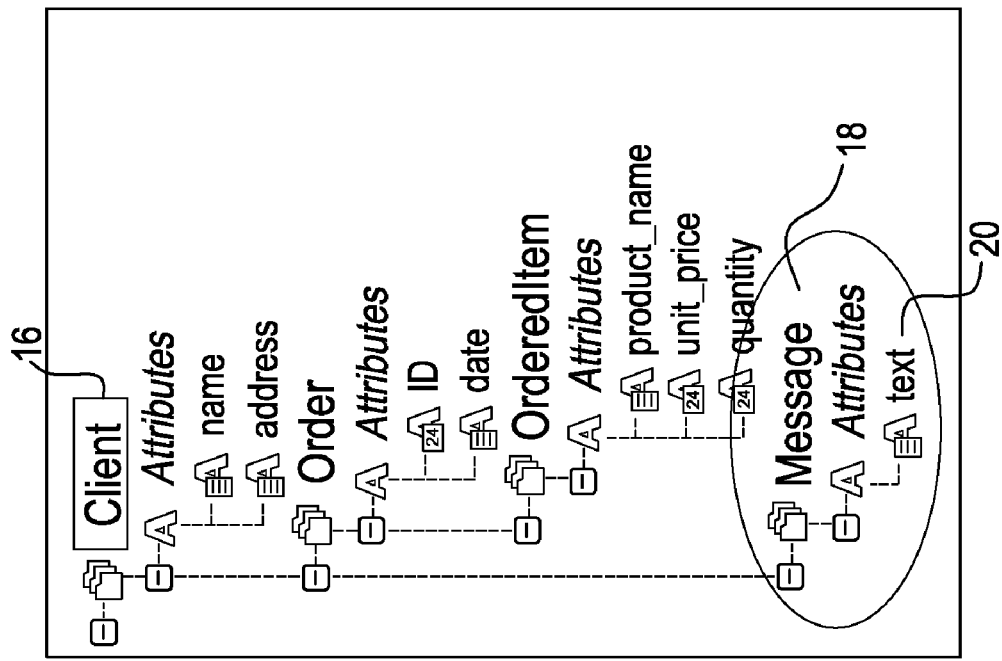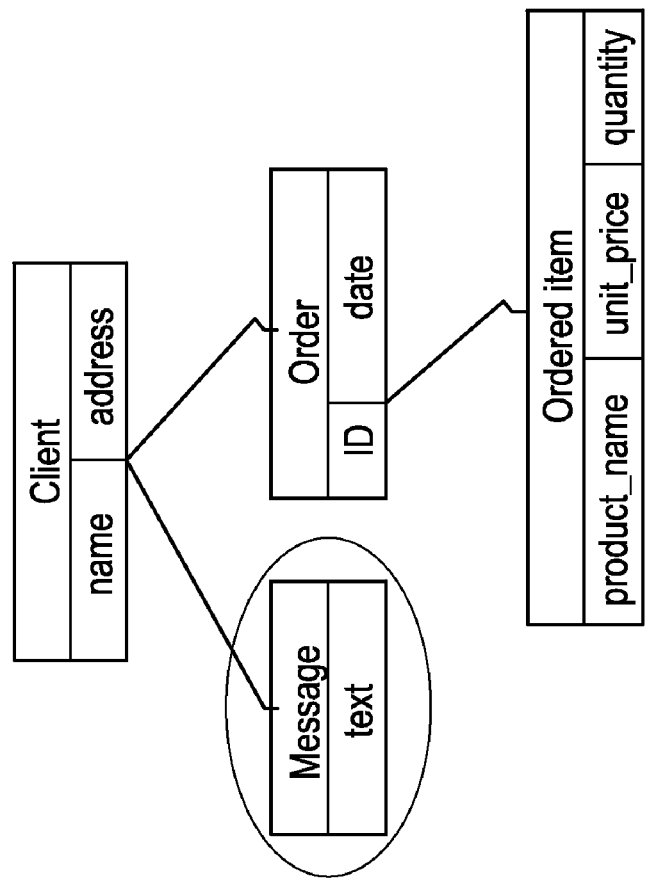
Fig.22

```
SELECT
    CLIENT.CLIENT_NAME                                  as CLIENT_NAME,
    CLIENT.CLIENT_ADDRESS                               as CLIENT_ADDRESS,
    CLIENT_ORDER.ORDER_ID                               as ORDER_ID,
    to_char(CLIENT_ORDER.ORDER_DATE, 'DD.MM.YYYY')      as ORDER_DATE,
    PRODUCT.PRODUCT_NAME                                as ORDERED_PRODUCT_NAME,
    PRODUCT.PRODUCT_PRICE                               as ORDERED_PRODUCT_PRICE,
    ORDER_ITEM.ITEM_QUANTITY                            as ORDERED_PRODUCT_QUANTITY
    MESSAGE.MSG_TEXT                                    as MESSAGE_FOR_CLIENT
from
    CLIENT
    INNER JOIN CLIENT_ORDER ON
        CLIENT_ORDER.ORDER_CLIENT = CLIENT.CLIENT_NAME
    INNER JOIN ORDER_ITEM ON
        ORDER_ITEM.ITEM_ORDER = CLIENT_ORDER.ORDER_ID
    INNER JOIN PRODUCT ON
        PRODUCT.PRODUCT_NAME = ORDER_ITEM.ITEM_PRODUCT
    LEFT JOIN MESSAGE ON
        MESSAGE.MSG_RECIPIENT = CLIENT.CLIENT_NAME
where
    CLIENT_ORDER.ORDER_DATE between
        to_date ('01.04.2010','DD.MM.YYYY') and
        to_date ('30.04.2010','DD.MM.YYYY')
```

Fig. 24

| | | | |
|---|---|---|---|
| Apple | | | CLIENT_NAME |
| Cupertino | | | CLIENT_ADDRESS |
| 3 | | | ORDER_ID |
| 12.04.2010 | | | ORDER_DATE |
| disk | | | ORDER_PRODUCT_NAME |
| 123.00 | | | ORDER_PRODUCT_PRICE |
| 9 | | | ORDER_PRODUCT_QUANTITY |
| Pay... | | | MESSAGE_FOR_CLIENT |

| | | | |
|---|---|---|---|
| Apple | Apple | Apple | CLIENT_NAME |
| Cupertino | Cupertino | Cupertino | CLIENT_ADDRESS |
| 3 | 1 | 1 | ORDER_ID |
| 12.04.2010 | 08.04.2010 | 08.04.2010 | ORDER_DATE |
| disk | disk | disk | ORDER_PRODUCT_NAME |
| 123.00 | 123.00 | 123.00 | ORDER_PRODUCT_PRICE |
| 9 | 7 | 7 | ORDER_PRODUCT_QUANTITY |
| Want. | Pay. | Want.. | MESSAGE_FOR_CLIENT |

(Additional column: Microsoft / Redmond / 2 / 08.04.2010 / disk / 123.00 / 12 / — and Apple / Cupertino / 1 / 08.04.2010 / mouse / 9.00 / 4 / Pay...)

Fig.25

```
SELECT
    CLIENT.CLIENT_NAME                      as CLIENT_NAME,
    MESSAGE.MSG_TEXT                        as MESSAGE_FOR_CLIENT
from
    CLIENT
    INNER JOIN MESSAGE ON
        MESSAGE.MSG_RECIPIENT = CLIENT.CLIENT_NAME where
    CLIENT.CLIENT_NAME IN
    (
    select
         CLIENT_ORDER.ORDER_CLIENT
    where
         CLIENT_ORDER
    where
         CLIENT_ORDER.ORDER_DATE   between
             to_date ('01.04.2010','DD.MM.YYYY')  and
             to_date ('30.04.2010','DD.MM.YYYY')
    );
```

Fig.26

| Apple | Apple | CLIENT_NAME, |
|---|---|---|
| Pay... | Want... | MESSAGE_FOR_CLIENT |

Fig.27

| Query Name | Status Table | Use Original Query | Is View | |
|---|---|---|---|---|
| Query | | ☐ | ☐ | Editor... |

| Attributes | |
|---|---|
| Name | Type |
| CLIENT_NAME | String |
| CLIENT_ADDRESS | String |
| ORDER_ID | Numeric |
| ORDER_DATE | Date Time |
| ORDERED_PRODUCT_NAME | String |
| ORDERED_PRODUCT_PRICE | Numeric |
| ORDERED_PRODUCT_QUANTITY | Numeric |

| Query Name | Status Table | Use Original Query | Is View | |
|---|---|---|---|---|
| Query_1 | | ☐ | ☐ | Editor... |

| Attributes | |
|---|---|
| Name | Type |
| CLIENT_NAME | String |
| MESSAGE_FOR_CLIENT | String |

```
SELECT
    CLIENT.CLIENT_NAME              as CLIENT_NAME,
    MESSAGE.MSG_TEXT                as MESSAGE_FOR_CLIENT
from
    CLIENT
    INNER JOIN MESSAGE ON
        MESSAGE.MSG_RECIPIENT = CLIENT.CLIENT_NAME
where
    CLIENT.CLIENT_NAME IN select
        CLIENT_ORDER.ORDER_CLIENT
    where
        CLIENT_ORDER
    where
        CLIENT_ORDER.ORDER_DATE   between
            to_date ('01.04.2010','DD.MM.YYYY')  and
            to_date ('30.04.2010','DD.MM.YYYY')
```

Fig.28

SELECT

---

A.aK as aK,

A.a1 as a1,

A.a2 as a2,

---

B.bK as bK,

B.b1 as b1,

B.b2 as b2,

---

C.cK as cK,

C.c1 as c1,

C.c2 as c2,

---

D.dK as dK,

D.d1 as d1,

D.d2 as d2,

---

E.eK as eK,

E.e1 as e1,

E.e2 as e2,

--- from

A, B, C, D, E where

A.aK >= : (PAR_FROM) and A.aK < : (PAR_TO) and

B.baK = A.aK and

C.cbK = B.bK and

D.dbK = C.bK and

E.eaK = A.aK

Fig.34

My Projects\plus design\design00\Q1 ×

Name:
Q1

Description:

EDF type:
Database type
EDF device type:
Oracle

☐ Case sensitive names wi

General | Processing info

Table Name

| Query Name | Status Table | |
|---|---|---|
| Q1 | | Editor... |

| Attributes | |
|---|---|
| Name | Type |
| aK | Numeric |
| a1 | Numeric |
| a2 | String |
| bK | Numeric |
| b1 | Numeric |
| b2 | String |
| cK | Numeric |
| c1 | Numeric |
| c2 | String |
| dK | Numeric |
| d1 | Numeric |
| d2 | String |
| eK | Numeric |
| e1 | Numeric |
| e2 | String |

| Parameters | | | | | | |
|---|---|---|---|---|---|---|
| Name | Data type | Default value | Database Type | Max Length | Precision | Scale |
| PAR_FROM | Numeric | | NUMBER | | 10 | 0 |
| PAR_TO | Numeric | | NUMBER | | 10 | 0 |

Fig.36

Fig.42
Fig.43
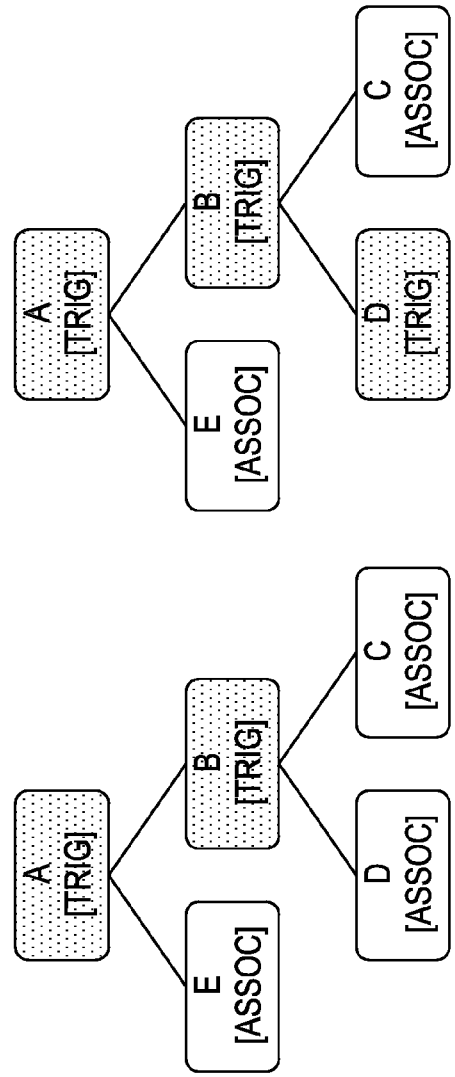
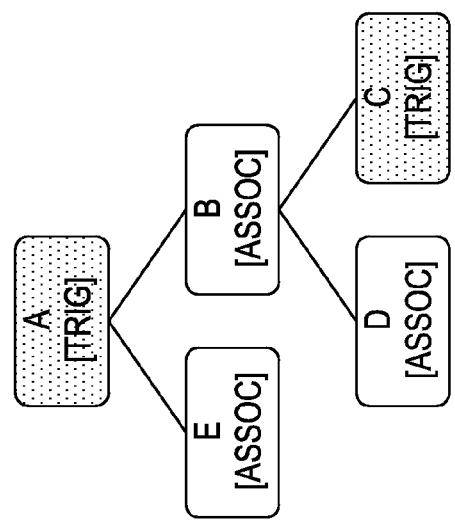
Fig. 44

SELECT
---
A.aK   as   aK,
A.a1   as   a1,
A.a2   as   a2,
---
B.bK   as   bK,
B.b1   as   b1,
B.b2   as   b2,
---
C.cK   as   cK,
C.c1   as   c1,
C.c2   as   c2,
---
from
A, B, C,
where
A.aK >= : (PAR_FROM) and A.aK < : (PAR_TO) and
B.baK = A.aK and
C.cbK = B.bK

Fig.48

```
SELECT
---
A.aK   as   aK,
---
E.eK   as   eK,
E.e1   as   e1,
E.e2   as   e2,
---
from
A, E,
where
A.aK >= : (PAR_FROM)  and  A.aK < : (PAR_TO)  and
E.eaK = A.aK and
```

Fig.49

```
SELECT SELECT
       ---
       A.aK   as   aK,
       ---
       B.bK   as   bK,
       ---
       D.dK   as   dK,
       D.d1   as   d1,
       D.d2   as   d2,
       ---
       from
       A, B, D,
       where
       A.aK >= : (PAR_FROM) and A.aK < : (PAR_TO) and
       B.baK = A.aK and
       D.dbK = B.bK
```

Fig.50

Parallel Stream Processors Mode:

Sequential Stream Processors Mode:

FAST HIERARCHICAL ENRICHMENT

This invention relates to hierarchical enrichment and to the conversion of flat data records to a hierarchical structure in a fast and efficient manner.

Incorporated into this specification by reference are the applicant's following 9 US patent applications: U.S. Ser. Nos. 12/648,617, 12/648,624, 12/648,628, 12/648,636, 12/648,641, 12/648,649, 12/648,652, 12/648,656, and 12/648,660.

BACKGROUND OF THE INVENTION

The way data is usually organised in databases and the way data is processed is often not optimal for efficiency and processing speed. An example of a simple database in a common format is shown in FIG. 1. Suppose there is a newly installed database comprising four small tables as shown in FIG. 1. The first table FIG. 1a is called CLIENT and the column called CLIENT_NAME is the table's primary key (see the exclamation mark). Initially this table contains two records: one for Apple and one for Microsoft. The second column called CLIENT_ADDRESS contains the addresses of the clients. The second table, shown in FIG. 1b, called PRODUCT has a column PRODUCT_NAME, which is the table's primary key. Initially this table contains two records: one for 'mouse' and one for 'disk'. The second column called PRODUCT_PRICE contains the corresponding price of the 'mouse' and 'disk'. The third table, which is shown in FIG. 1c, is called CLIENT_ORDER and stores the orders made by clients. Column ORDER_ID is the table's primary key and column ORDER_CLIENT is to contain the corresponding client registered in table CLIENT. The table is empty, as no orders have been made by the clients in the first example. The fourth table, shown in FIG. 1d, is called ORDER_ITEM and may store the quantities of products commissioned in a particular order, e.g. a client might commission 3 mice and 5 disks in a single order, which would result in two records added to the table—one for the mice and one for the disks. The column ITEM_ORDER contains the order the product was commissioned in, while column ITEM_PRODUCT contains the name of the commissioned product. The table is empty, as no orders have been made by the clients yet.

In this example, on the 8th of April Apple makes the first order with ORDER_ID=1 and they want to buy 7 disks and 4 mice. The database is changed as shown in FIG. 2. The tables CLIENT_ORDER and ORDER_ITEM are populated with the corresponding data.

On the very same day, Microsoft send in their order, which order will have identifier ORDER_ID=2, and they want to buy 12 disks. FIG. 3 shows how the tables CLIENT_ORDER and ORDER_ITEM are updated with the corresponding data.

Four days later the last order is placed by Apple, who orders 9 disks. FIG. 4 shows how the tables CLIENT_ORDER and ORDER_ITEM are updated with the corresponding data.

At the end of month the clients are charged for what they have ordered and a detailed invoice needs to be generated for each client. Examples of invoices are shown in FIGS. 5 and 6. The products are listed under the corresponding orders. The structure of the invoice is an example of a final format for presenting the data and the data need to be transformed from the database structure as shown in FIGS. 1 to 4 into the structure of the invoice as shown in FIGS. 5 and 6

The data stored in the database is not organized in the way the invoice is organised. Instead, each type of object has an individual table that stores the objects of that type (i.e. one object in one row). The relationships between the objects are maintained by keeping a unique identifier of the referred object within the row of the referring object—e.g. order of ID "3" refers to the client of name "Apple". FIG. 7 illustrates with arrows 2 how the relationships between the objects are maintained.

To retrieve the data from the database in the form that is closest to the form of the invoice, the database needs to be queried using an SQL "select" statement as illustrated in FIG. 8. Looking at the SQL Select statement in FIG. 8, we can see that the first part of the statement defines the output fields (Client_name, Client_address, Order_ID etc) which will appear in the stream of output records shown in the table of FIG. 9. The next part of the Select statement defines the manner in which the tables are joined to produce the output data.

The SQL engine in the database server executes the statement and returns a stream of records made up of combinations of correlated rows taken from the database tables, as shown in FIG. 9.

As FIG. 9 shows, each record in the stream is a result of matching or chaining four correlated rows—one row from each of the four tables.

For example, the first record (the first row) in the stream of FIG. 9 is generated by the following sequence of matches:
1. matching the row "Apple" from table CLIENT with row "1" from table CLIENT_ORDER (as CLIENT.CLIENT_NAME=CLIENT_ORDER.ORDER_CLIENT),
2. matching row "1" from table CLIENT_ORDER with row "1"-"mouse" from table ORDER_ITEM (as ORDER_ITEM.ITEM_ORDER=CLIENT_ORDER.ORDER_ID)
3. "1"-"mouse" from table ORDER_ITEM with row "mouse" from table PRODUCT (as ORDER_ITEM.ITEM_PRODUCT=PRODUCT.PRODUCT_NAME)

The second record in the stream is generated by the following sequence of matches:
1. matching row "Apple" from table CLIENT with row "1" from table CLIENT_ORDER—as previously (as CLIENT.CLIENT_NAME=CLIENT_ORDER.ORDER_CLIENT),
2. matching row "1" from table CLIENT_ORDER with row "1"-"disk" from table ORDER_ITEM (as ORDER_ITEM.ITEM_ORDER=CLIENT_ORDER.ORDER_ID),
3. "1"-"disk" from table ORDER_ITEM with row "disk" from table PRODUCT (as ORDER_ITEM.ITEM_PRODUCT=PRODUCT.PRODUCT_NAME).

An important consequence of the fact that the "select" statement delivers data in the form presented above is the occurrence of redundancies in the delivered data. In FIG. 9 the gray fields contain redundant information: the "Apple"-"Cupertino"-"1"-"08.04.2010" foursome is present twice in the stream, simply because the order of ID=1 contains two items. If there were three items in the order, the "Apple"-"Cupertino"-"1"-"08.04.2010" would be tripled. This is how the execution of the SQL select statement works and that cannot be changed.

SQL statements always return flat structures and this is the reason that the redundancy occurs. It is necessary to replicate data when the original data is hierarchical. This can be seen in FIG. 9 which shows the flat structure while the invoices of FIGS. 5 and 6 are presented in a hierarchical structure.

Retrieving data from a database takes up memory in a computer which in turn increases the amount of processing needed; therefore, redundancies need to be avoided to optimise processing speed. The example given above is small and more realistic examples would comprise many entries, such that the problem of processing speed becomes more acute. It is not uncommon for computer programs to run out of memory when retrieving data from large databases.

The example of an SQL database is given, but the problems may occur when retrieving data from other storage systems such as operating system files.

There is a need to transform the flat and redundant data structure into a hierarchical and non-redundant data structure.

SUMMARY OF THE INVENTION

In one embodiment the invention is a method of generating computer instructions for creating instances of a hierarchical data format from a flat record stream, the flat record stream containing data in a flat format and containing at least some data redundancy. The method uses a computing device having at least a processor, a memory, a display device and an input device. The method includes allowing a developer to use the input device to create a graphical representation of the hierarchical data format, and allowing a developer to use the input device to create a graphical representation of a mapping between the flat format and the hierarchical format. The method further includes generating, at the processor, computer instructions which when executed on a computer cause the computer to create from the flat record stream instances of the hierarchical format, wherein the instances of the hierarchical format remove the data redundancy.

The invention also provides a computer programmed to perform a corresponding method, and a computer readable medium containing computer-readable instructions for performing a corresponding method.

BRIEF DESCRIPTION OF THE DRAWINGS

FIG. 1 shows an example of a database comprising four tables;
FIG. 2 shows the example of FIG. 1 which is further populated with data;
FIG. 3 shows the example of FIG. 1 which is further populated with data;
FIG. 5 shows an example of an invoice generated from the database of FIG. 4;
FIG. 6 shows an example of an invoice generated from the database of FIG. 4;
FIG. 8 shows an SQL select statement to retrieve data from the database of FIG. 4;
FIG. 9 shows a table of data returned from an SQL query;
FIG. 20 shows a resulting invoice;
FIG. 21 shows the addition of a new table;
FIG. 22 shows a change of a tree structure;
FIG. 24 shows an SQL statement with an additional message;
FIG. 25 shows redundancies in a new query output;
FIG. 26 shows an additional EDF Query;
FIG. 27 shows the outcome of the Query of FIG. 26;
FIG. 28 shows an EDF;
FIG. 34 shows an example of a select statement;
FIG. 36 shows an EDF Query graphical representation;
FIG. 42 shows an icon of an associative normalizer;
FIG. 43 shows an icon of a triggered normalizer;
FIG. 44 shows a correct configuration of a normalizer tree;
FIG. 48 shows a select statement for path /A/B/C;
FIG. 49 shows a select statement for path /A/E;
FIG. 50 shows a select statement for path /A/B/D.

DETAILED DESCRIPTION OF THE INVENTION

Figure 4:
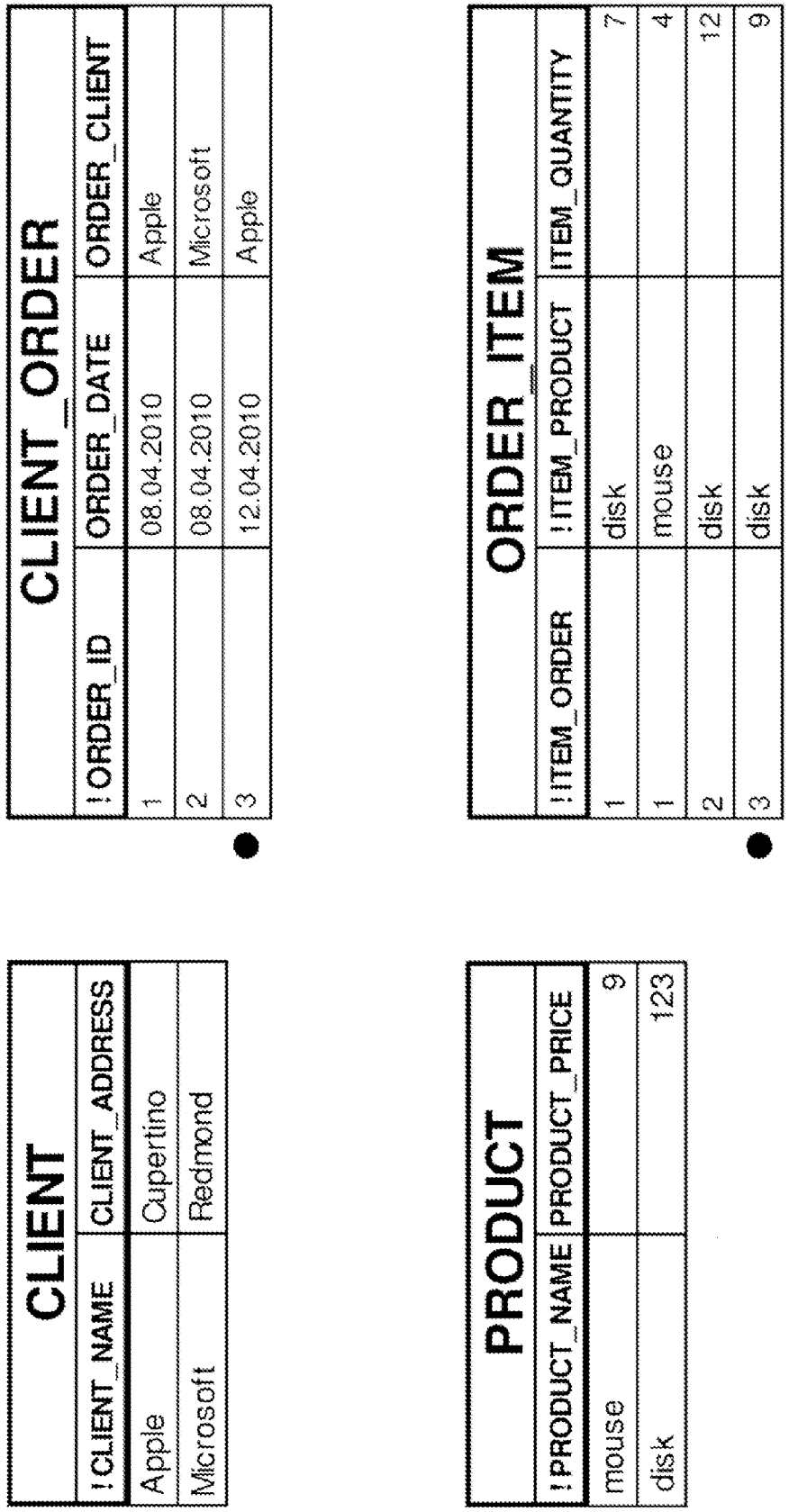
FIG. 4 shows the example of FIG. 1 which is further populated with data.
Figure 7:
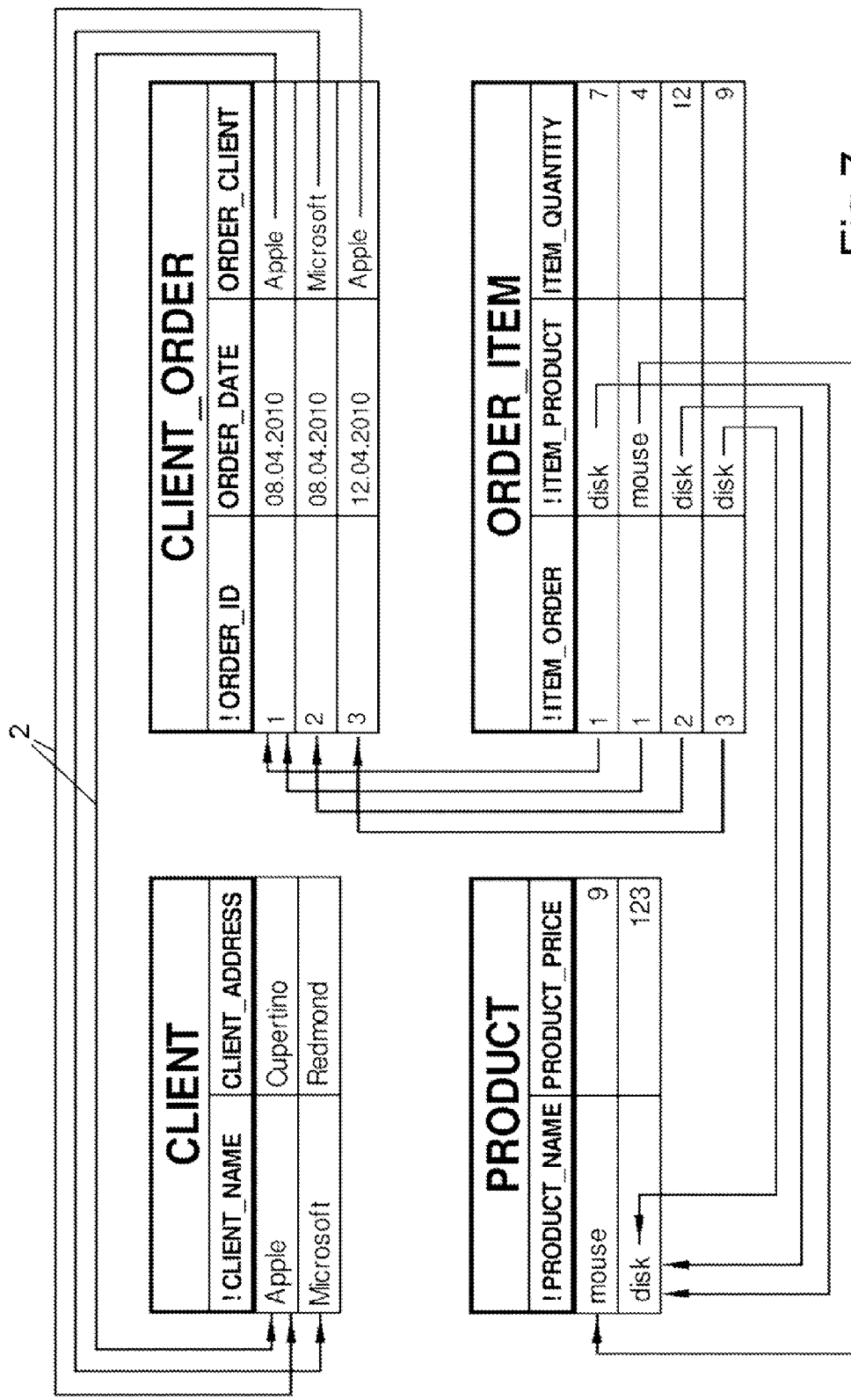
FIG. 7 shows the relationships between the objects in FIG. 4.
Figure 10:
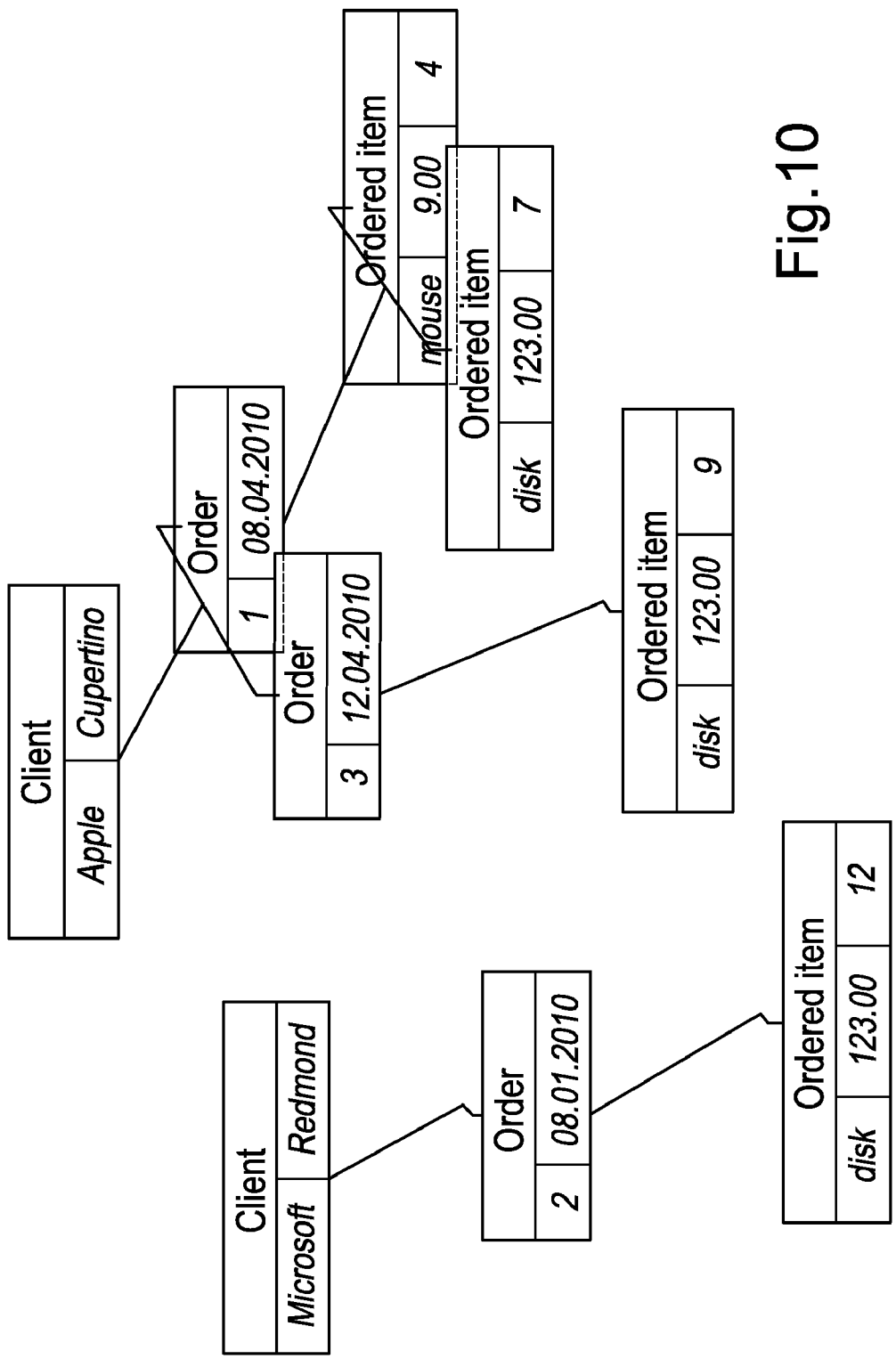
FIG. 10 shows two trees displaying the data of FIG. 9.

The stream of flat records shown in FIG. 9 containing redundancies is preferably transformed into a structure of two trees as shown in FIG. 10 that will be the base for producing the invoices of FIGS. 5 and 6.

Note that this representation of the data—unlike the "select" statement result set—contains no redundancies.

Figure 11:
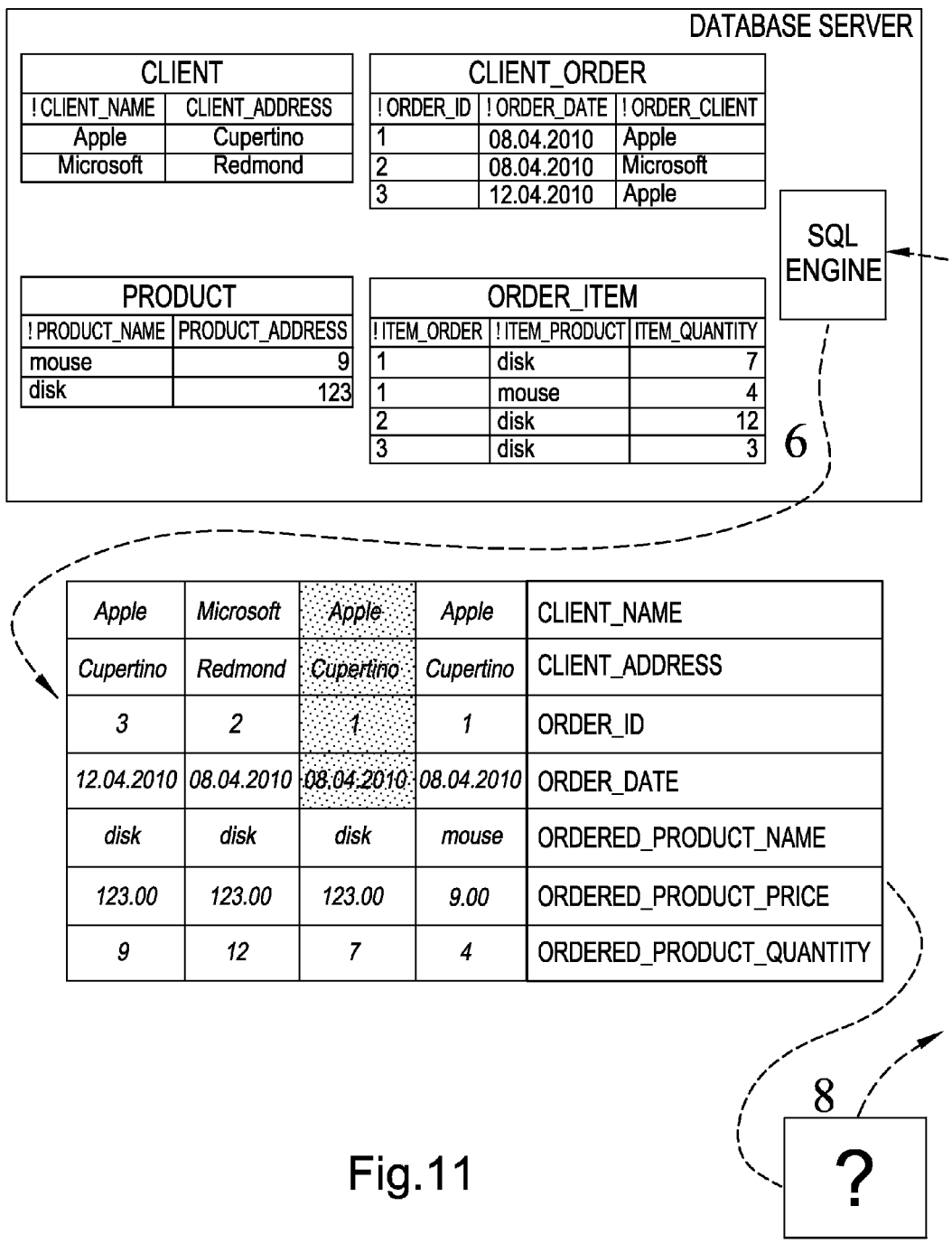
FIG. 11 shows the process of generating an invoice.
Figure 11:
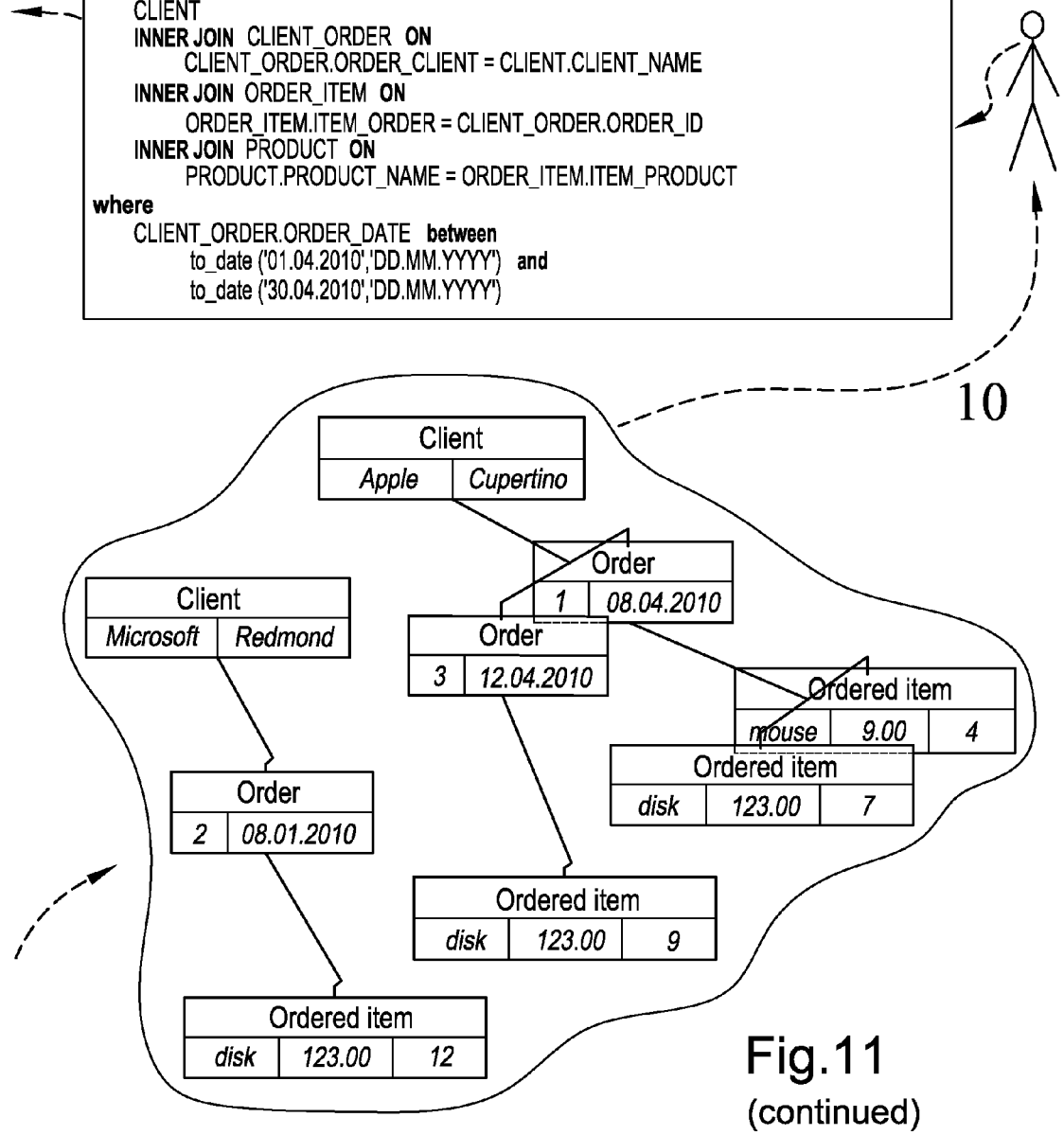
Figure 12:
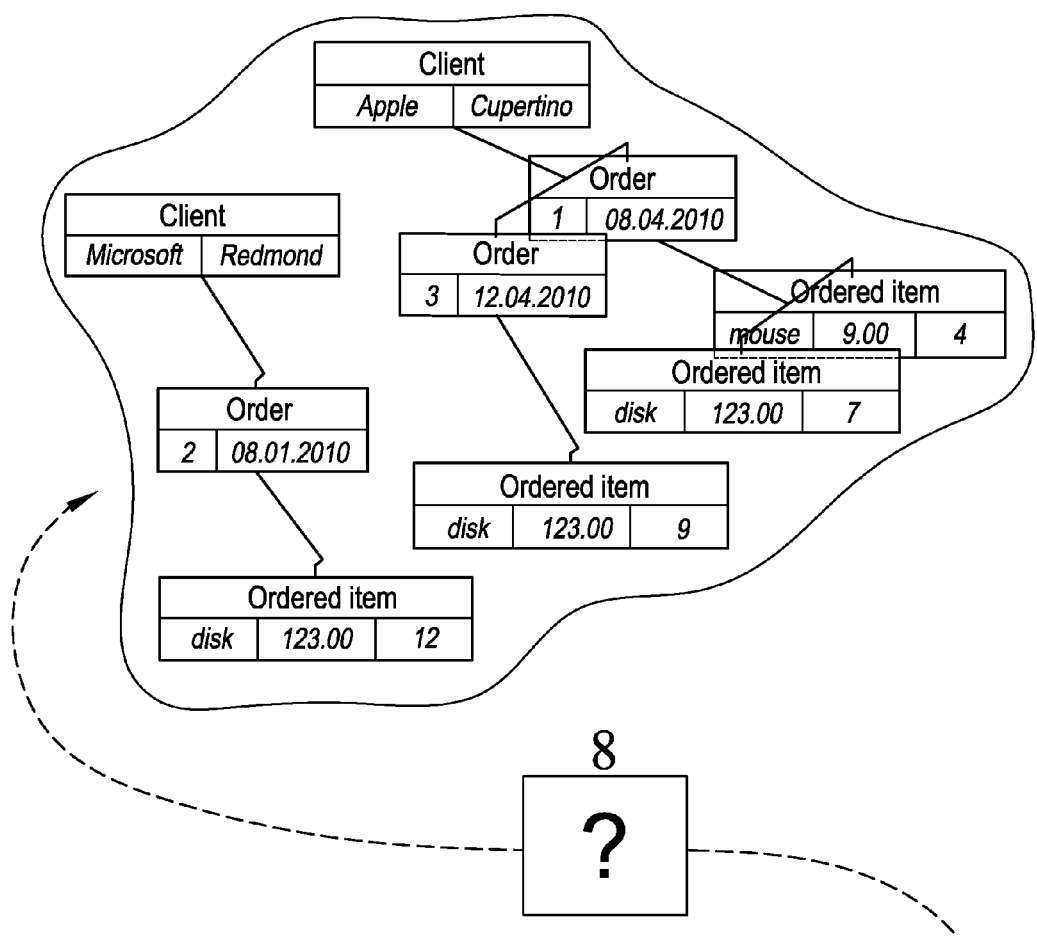
FIG. 12 shows a detail of FIG. 11.

FIGS. 11 and 12 show schematically the process for generating invoices from the data collected in the database. Four phases are distinguished in FIG. 11:

first, sending (4) an SQL "select" statement to the database server, second, the server's SQL engine executes (6) the statement and yields a stream of flat records (note: on this picture the stream is presented simply as a transposition of the table shown above; this representation will be used in the document from this point), third, the stream of flat records is to be reorganized (8) into trees of records, fourth, the trees of records are to be displayed (10) to the user in the form of invoices, ready for printing.

FIG. 12 shows the step in FIG. 11 of reorganising (8) the data to remove the redundancies and to create a hierarchical structure.

In Aptitude, the "phase 3. device" is an External Data Format Mapping (EDF Mapping), which is part of the Aptitude ProjectProgram, with some improvements available in version 3.00.

Here are the steps that the user of Aptitude should perform to build the "device".

1. Create an EDF Project Element instance with a single EDF Query that will stand for the format of the flat record stream returned by the SQL "select" statement. In the example below, the Project Element is named "get_invoices".

Figure 13:
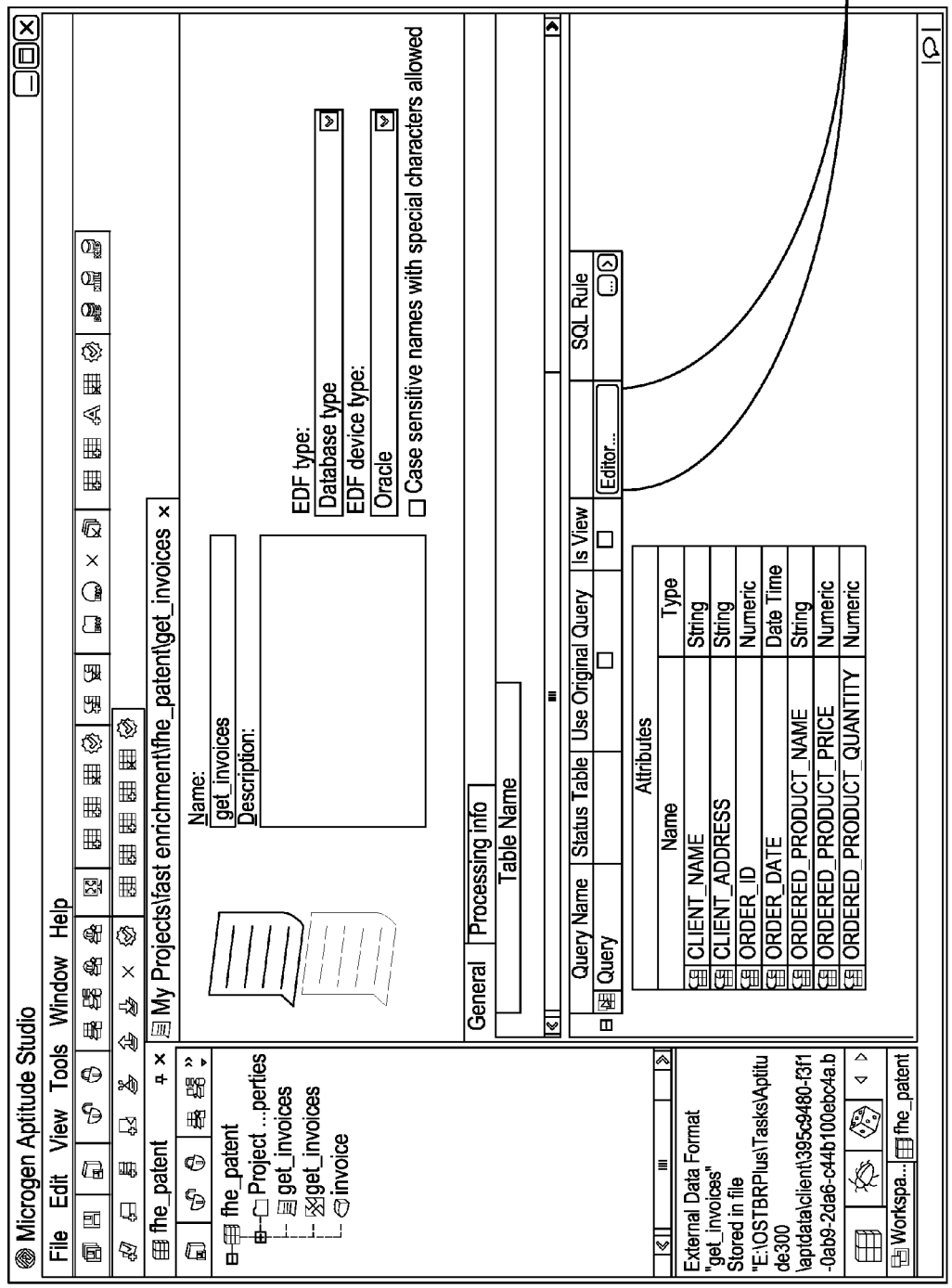
FIG. 13 shows embedding of an SQL statement in an EDF query.

This EDF Query is also to embed the SQL statement itself, which will be executed in runtime, but this is irrelevant here. This step is shown in FIG. 13.

Figure 14:
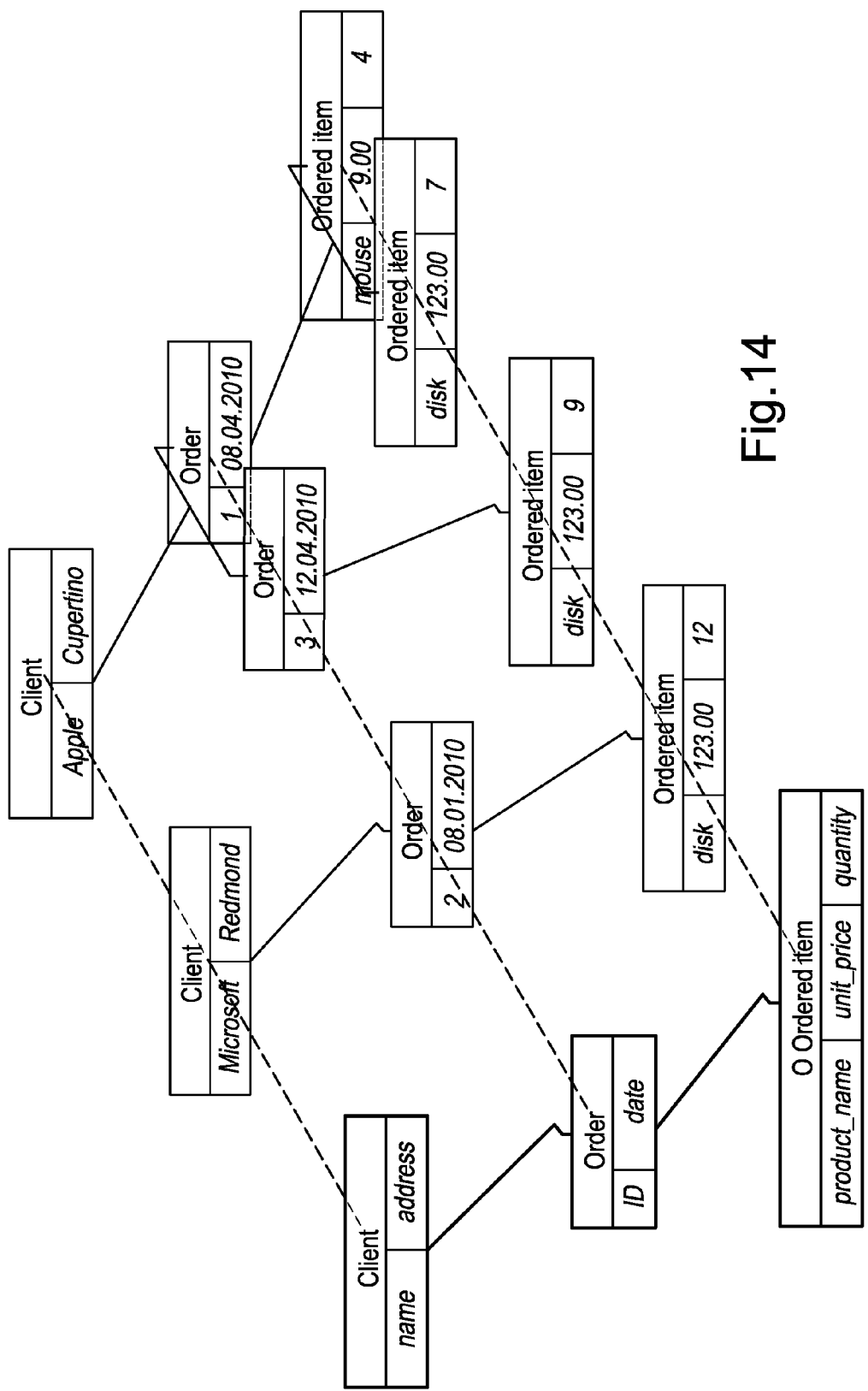
FIG. 14 shows an example of a tree structure.
Figure 15:
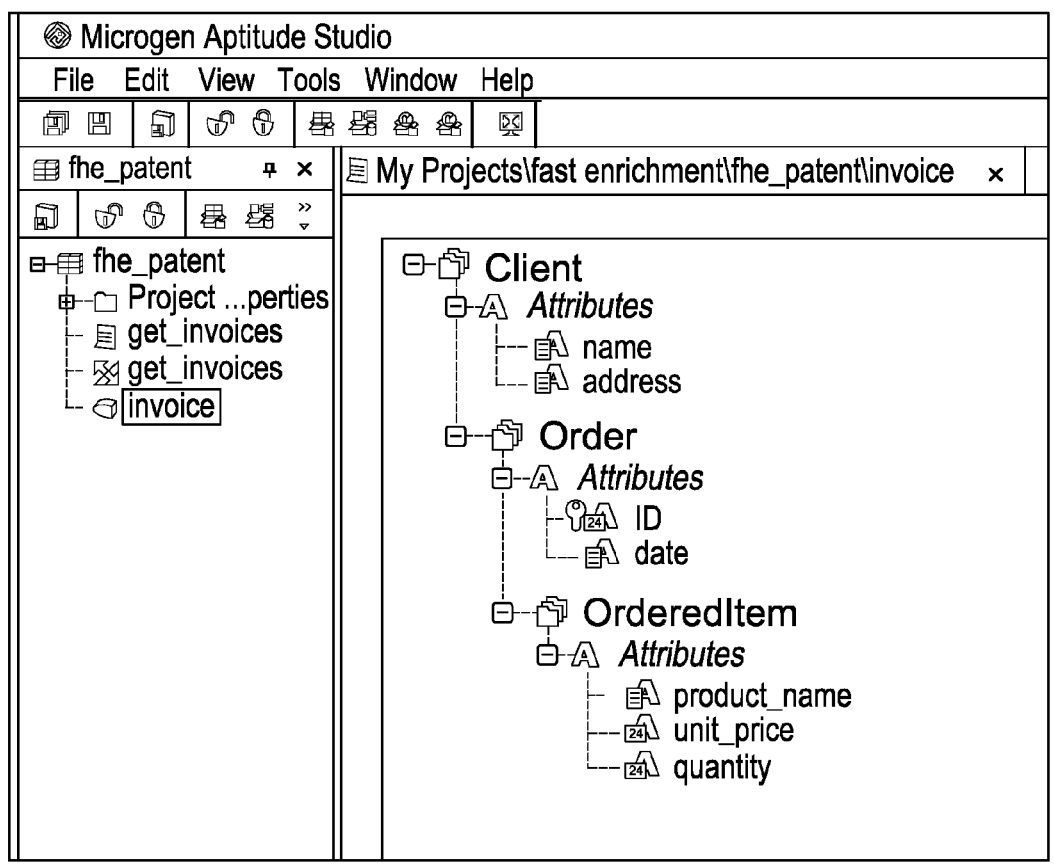
FIG. 15 shows an example of a Data Object.

2. Create a Data Object Project Element that will stand for the format of the record trees. This is where the user must rack their brains a bit to imagine a tree format/pattern that our record trees comply with. This step is shown in FIG. 14. An "embodiment" of the tree format should then be created in the form of a Data Object instance (a Data Object is another entity within an Aptitude Project and instances are created as needed). This step is shown in FIG. 15.

Figure 16:
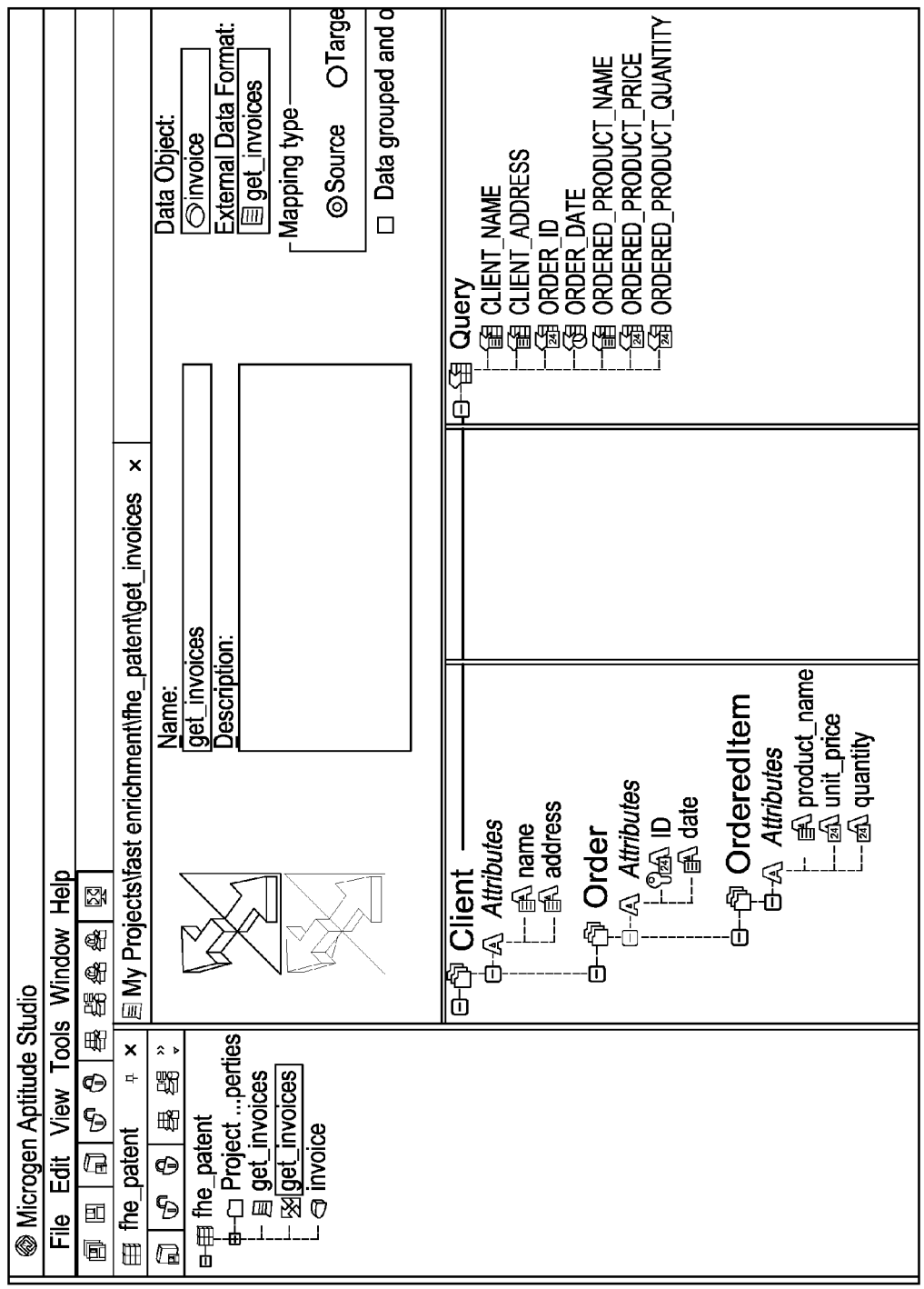
FIG. 16 shows an example of an EDF Mapping Project Element.

3. Create an EDF Mapping Project Element that will contain the user-defined transformation of the flat record stream format defined in the EDF Query into the record tree format defined in the Data Object. This step is shown in FIG. 16.

Figure 17:
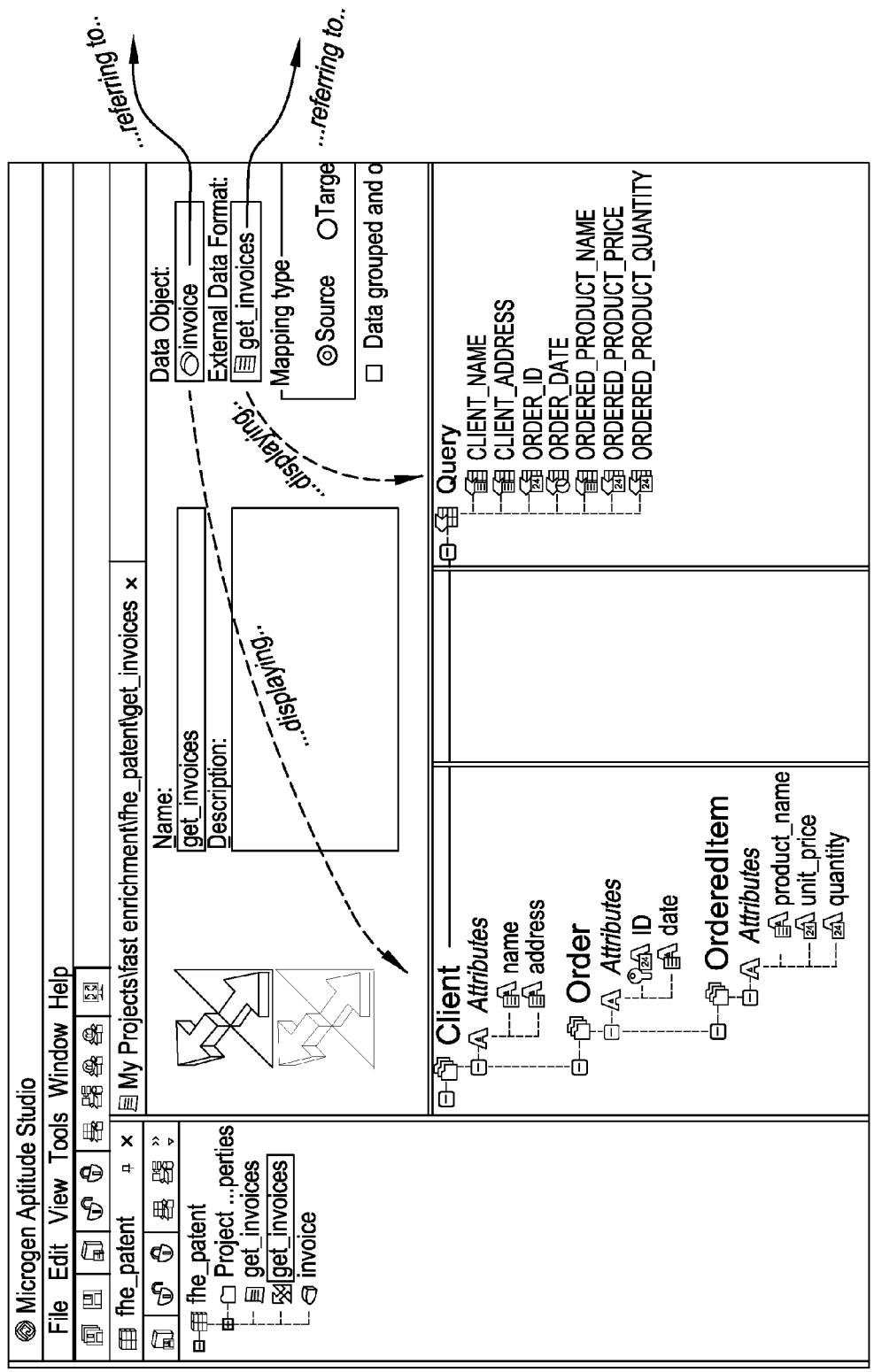
FIG. 17 shows the mapping with the EDF and Data Object.
Figure 17:
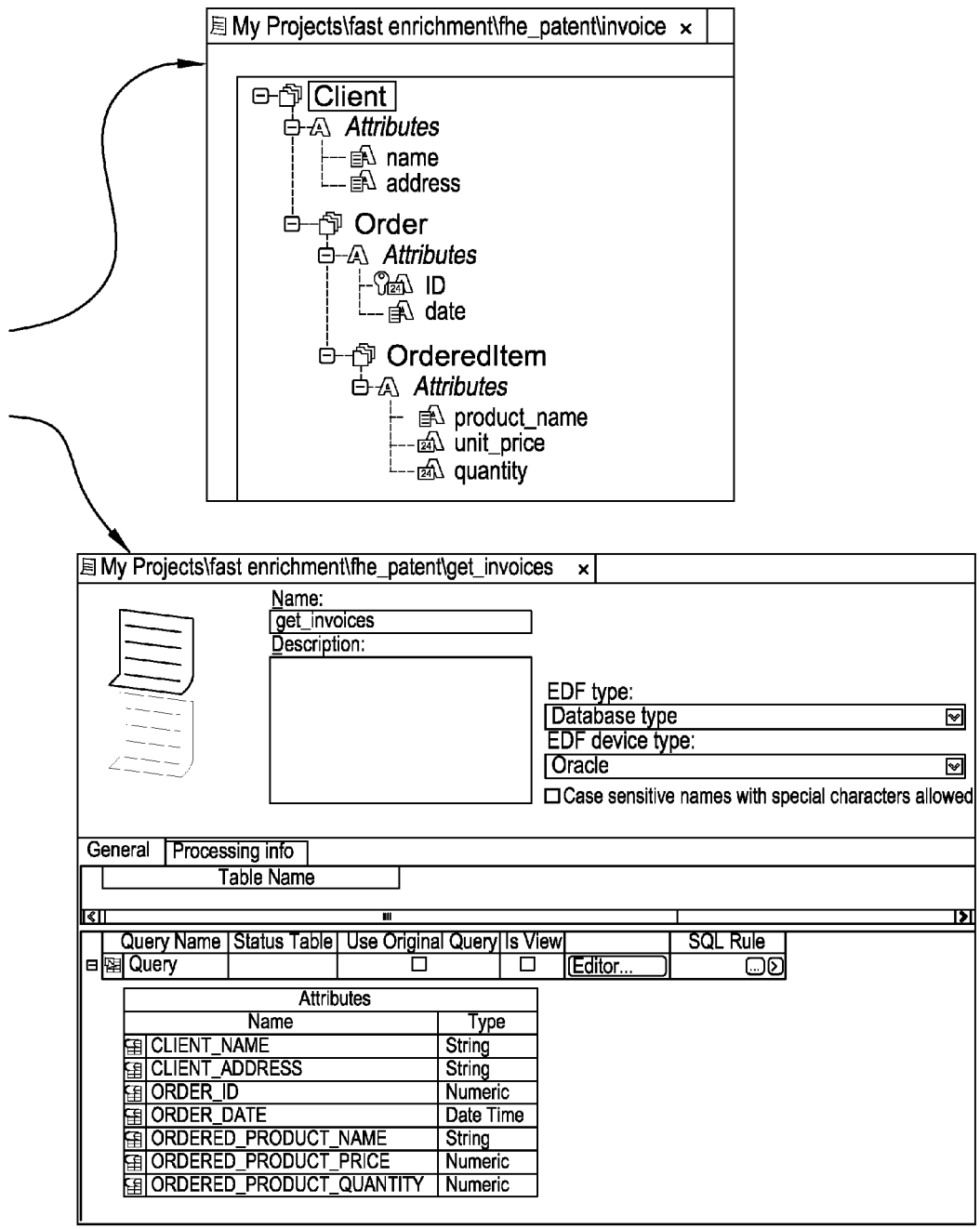

4. Note that the EDF Mapping refers to the previously defined EDF and Data Object and displays them in two neighbouring panels, as shown in FIG. 17.

Figure 18:
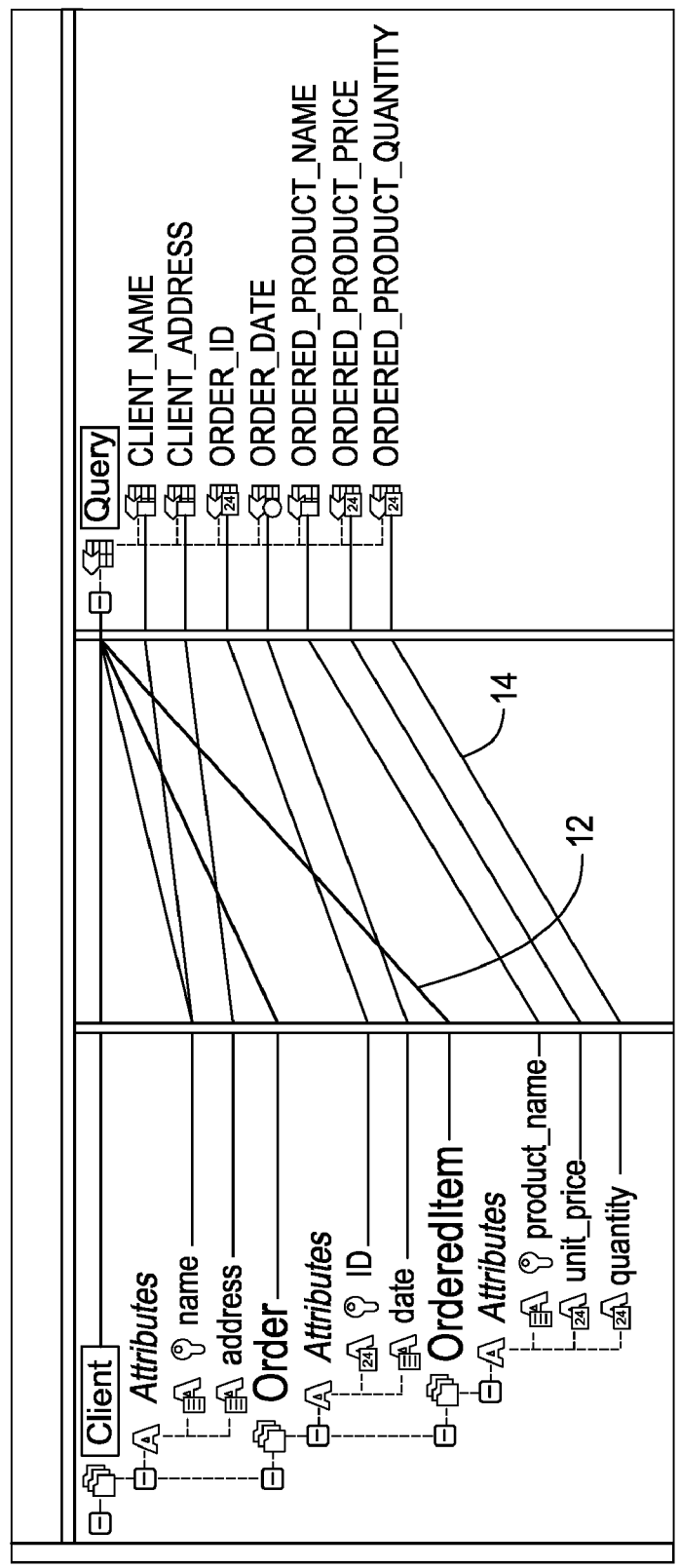
FIG. 18 shows a definition of a transformation.

5. Then, within the EDF Mapping, the user should define the transformation itself, as shown in FIG. 18:

a. the EDF Query should be linked to the Segments of the Data Object that are to be populated when in runtime, these links are shown as thick links (Note that thick links are used to define the mapping of segments and thin links to define the mapping of individual attributes) (12). In this example all the Segments are used.

b. fields of the EDF Query format should be linked to their corresponding Data Object Attributes, which links are shown as thin links (14).

c. each of the mapped Segments should have one or more Attributes appointed unique keys (see the "key" icons), which—when in runtime—will be used to unambiguously identify a single instance of Segment within its immediately superior ("parent") Segment instance.

Figure 19:
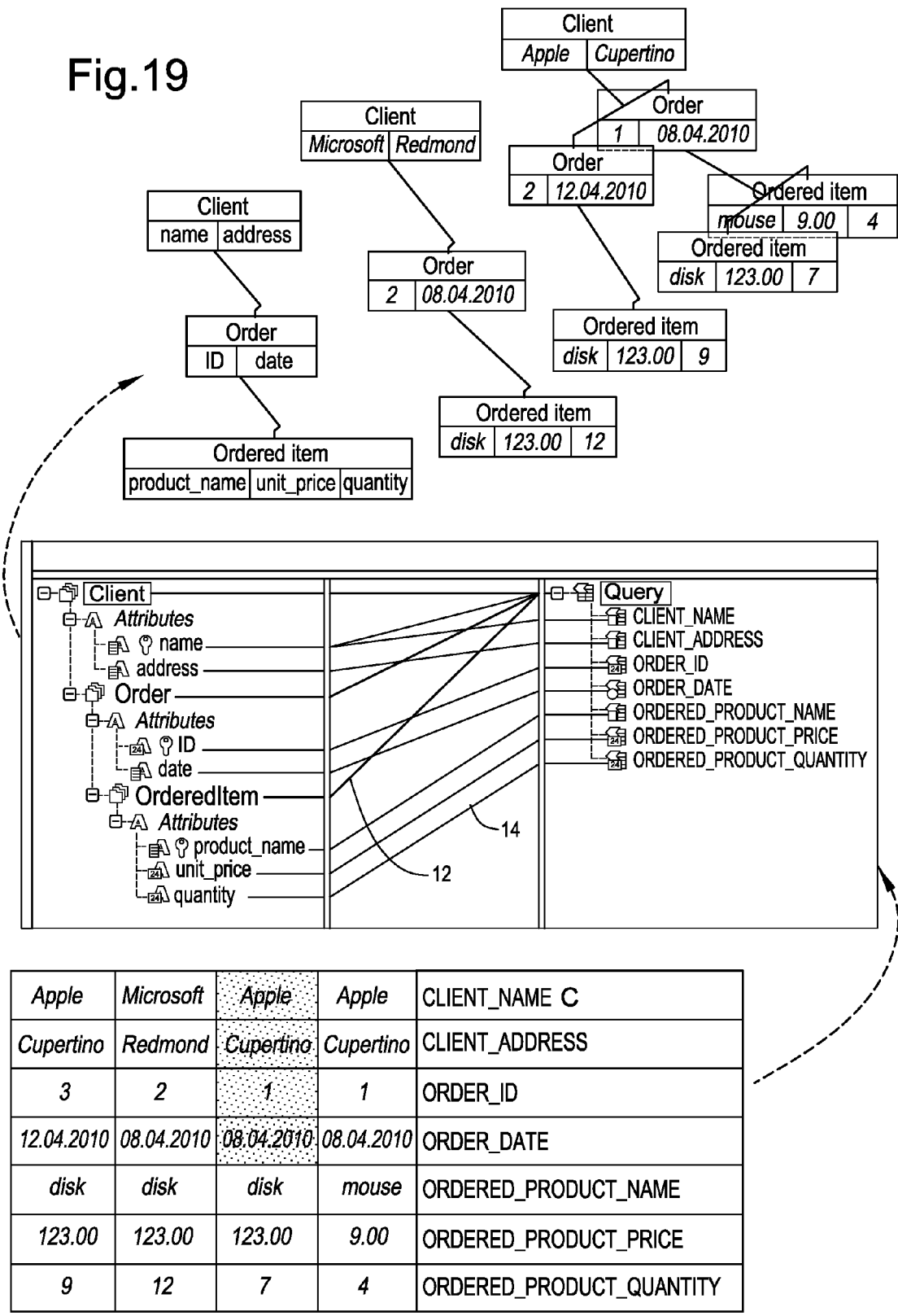
FIG. 19 shows an implementation of EDF mapping.

The "phase 3. device"—i.e. the EDF Mapping—is now ready to be used in any place in the Project where user might want to process or display the invoices for April. FIG. 19 shows an implementation of EDF mapping and this is process 8 in FIG. 12.

There is an additional important point to mention here: the implementation of EDF Mapping in Aptitude version 3.00 is made in such a way that it does not care whether the flat record stream is a result of an SQL "select" statement or not—all it cares about is the format of the stream. That means that we can use this implementation for any kind of device that produces a flat stream of records—it can be an SQL "select" statement, but it also can be a flat file reader, e.g. Excel file reader.

Suppose our marketing division decided that we should enrich our invoices with some optional "client-specific" messages/advertisements. The marketing division decided that in April Apple's invoice should contain two messages: "Want Apple logo on mouse? Commission 100 mice in one order."

"Pay 5% less for 1000 disks."

No messages are needed for Microsoft. The resulting invoice for Apple is then as shown in FIG. 20.

The marketing division creativity entails changes to the database: a new table named "MESSAGE" with two rows is added as shown in FIG. 21.

Our record tree format, and so the Data Object, is also changed: a root node "Client" (16) gains another child node named "Message" (18) with one field named "text" (20), as shown in FIG. 22.

Figure 23:
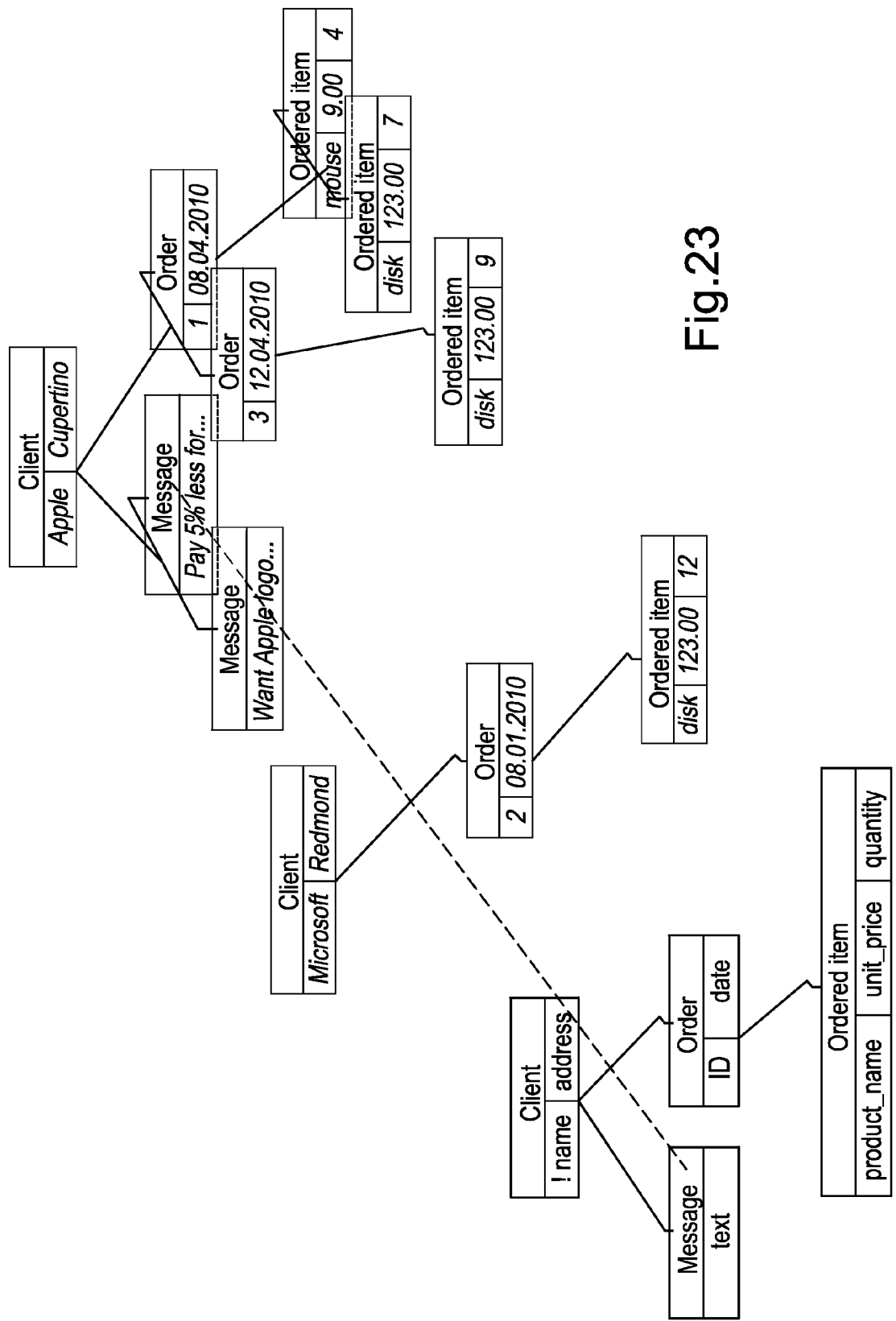
FIG. 23 shows a new format of a tree.

The record trees according to the new format will be as shown in FIG. 23.

So far we have changed the database and the Data Object (i.e. the record tree format). Now we also want to change the EDF and the EDF Mapping, starting with EDF. For an SQL-aware user it will be quite natural to simply alter the underlying SQL "select" statement as in FIG. 24.

Unfortunately, the result of such a query almost doubles the volume of the original stream, as shown in FIG. 25, the fields enclosed by the thick line are the new ones, whereby most of the fields are redundant (see the shaded fields). This will have a significant impact on processing performance when data volumes are large. The examples given in this specification are simplified examples for the purpose of explanation. However, is situations where the data is more complicated and where there are large quantities of data, the issue of redundancy in the data becomes a real and serious problem, which can cause a computing system to run out of available memory.

Within Aptitude V3, there is now a very efficient way to overcome this: within the EDF, the user should create another, independent EDF Query with a "select" statement as in FIG. 26. When in runtime, this Query can be executed independently of/in parallel with the first one. The result set of such a query will be as shown in FIG. 27: The EDF after the changes is shown in FIG. 28.

Figure 29:
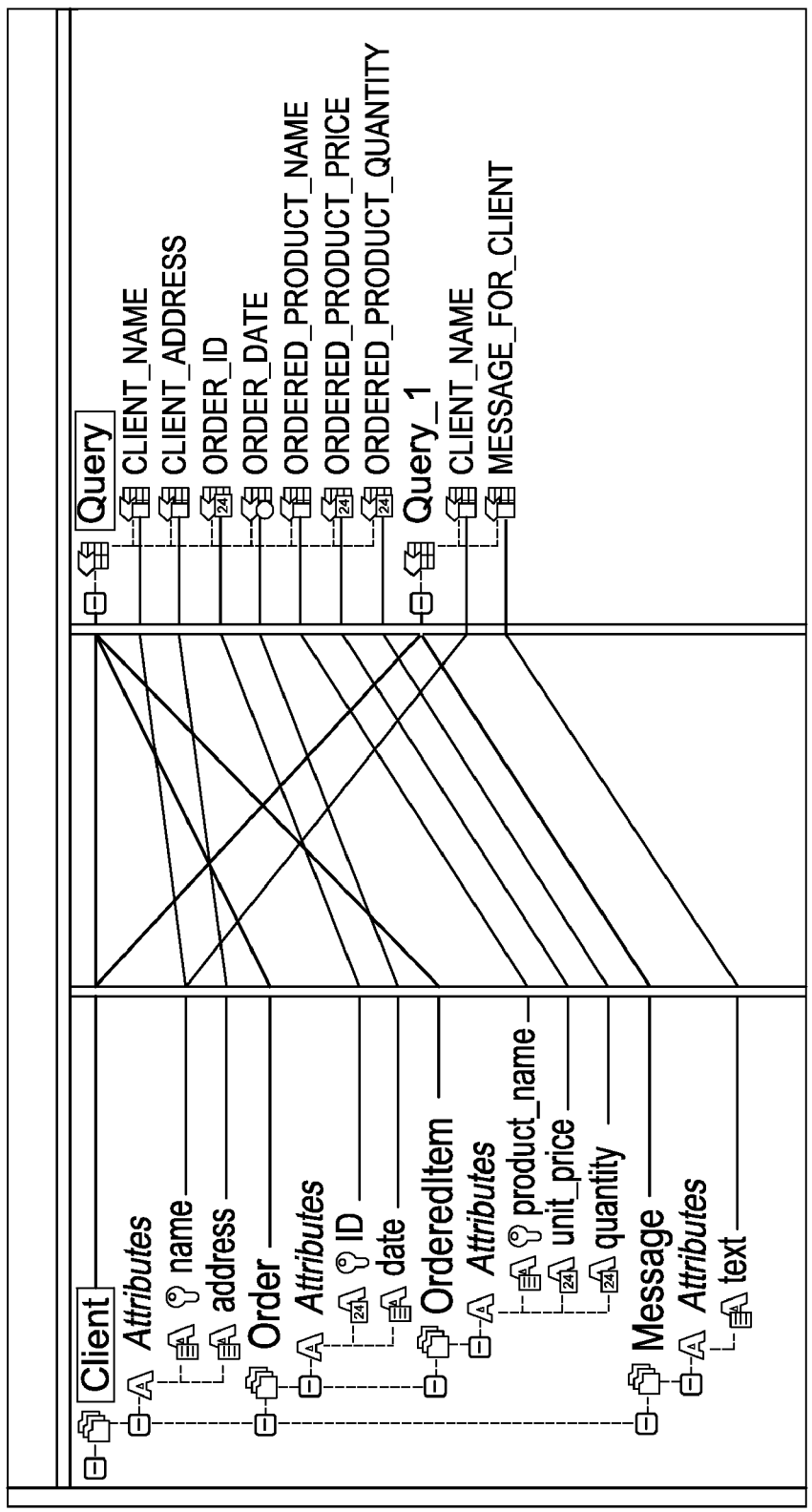
FIG. 29 shows EDF Mapping.

Now we need to change our EDF Mapping to stand up to the new EDF and Data Object (see FIG. 29).

As you can see, "Query_1" populates Segments "Client" and "Message" only, and in the "Client" it populates only the "name" Attribute as it will be required to match the results of "Query_1" with the results of "Query" (which will be explained later).

Figure 30:
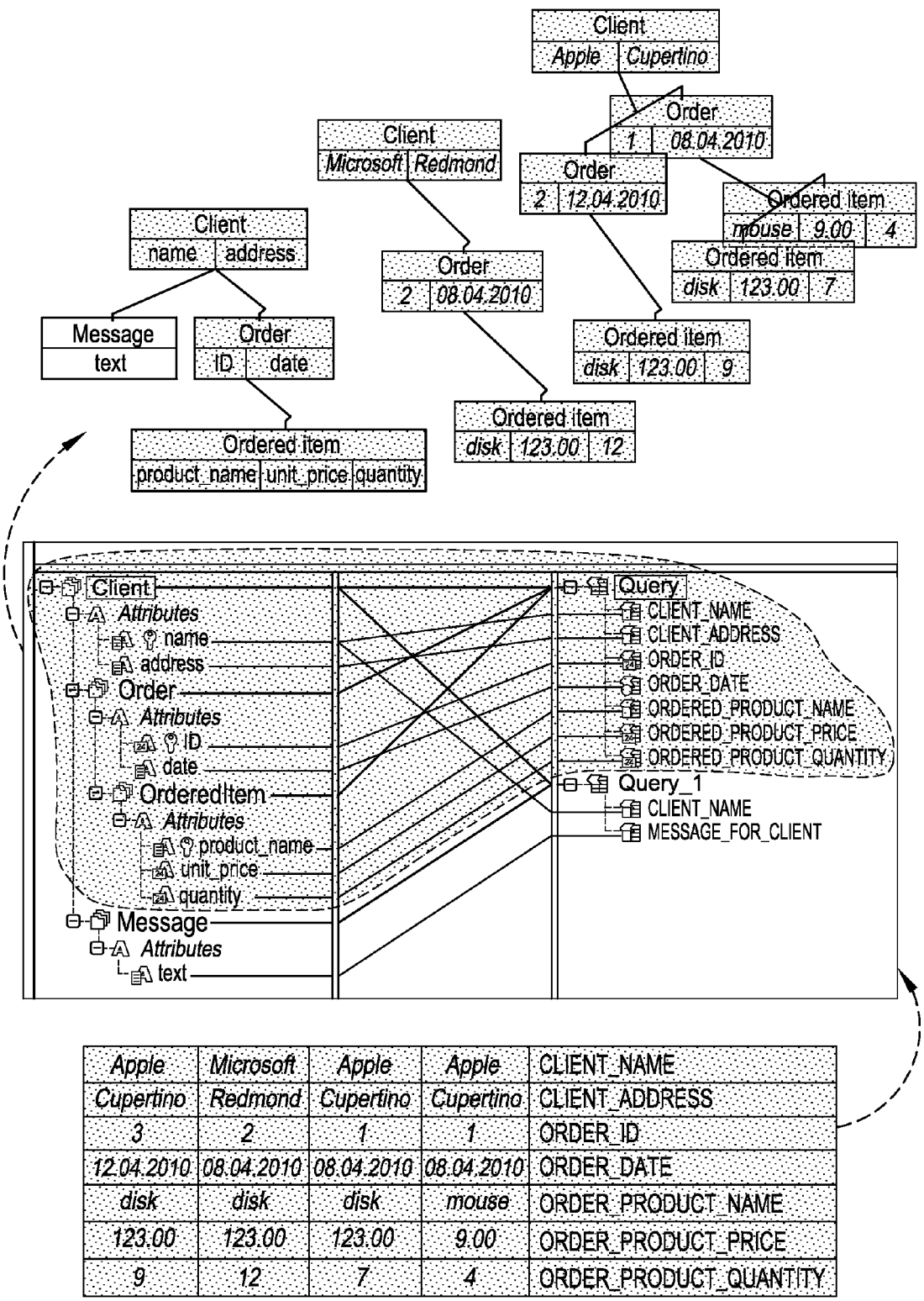
FIG. 30 shows a partial tree.
Figure 31:
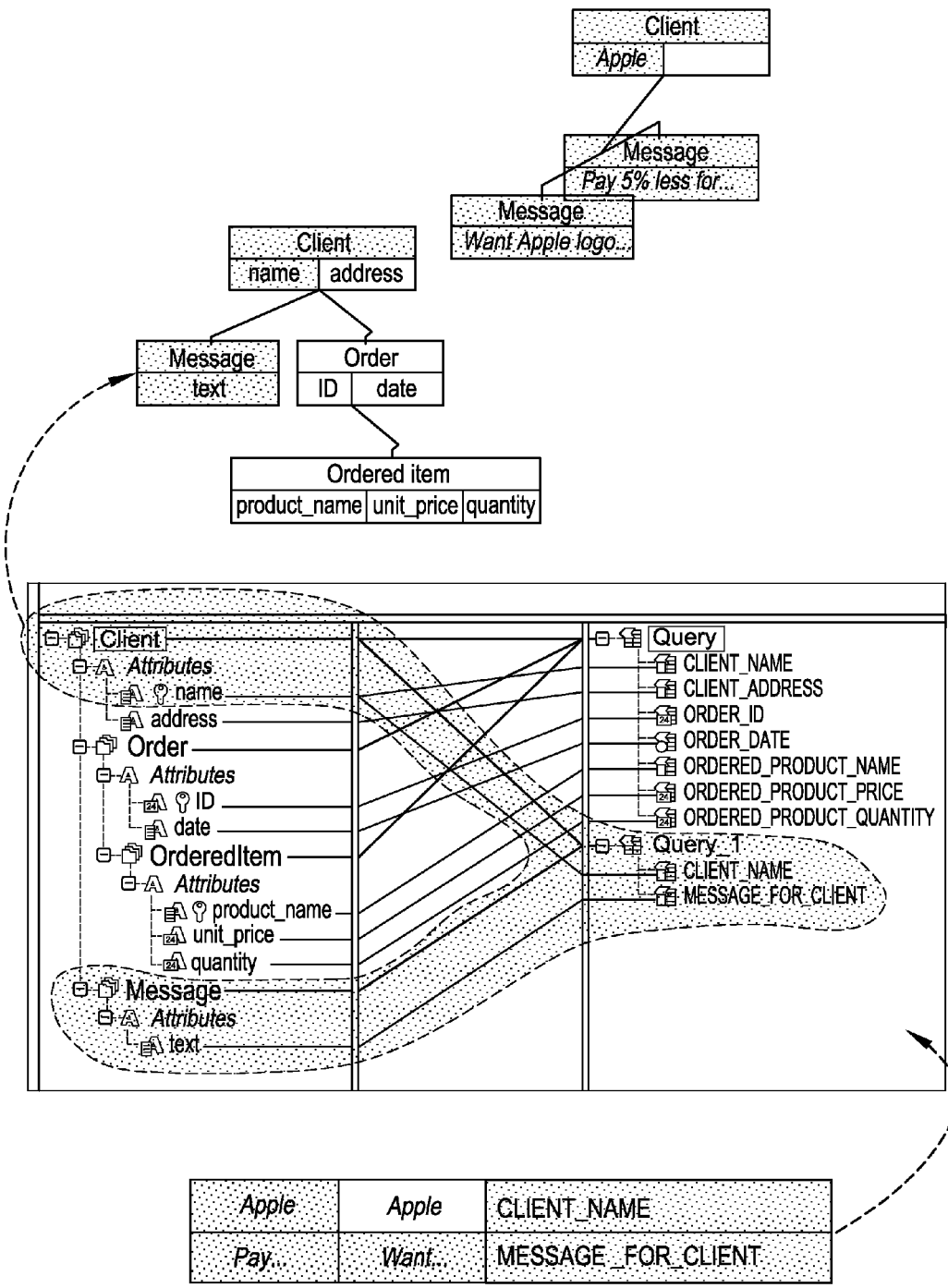
FIG. 31 shows a partial tree.

Having the recent changes considered, now we have two independent productions of "partial" record trees—one for "Query", shown in FIG. 30, and another one for "Query_1", shown in FIG. 31.

Figure 32:
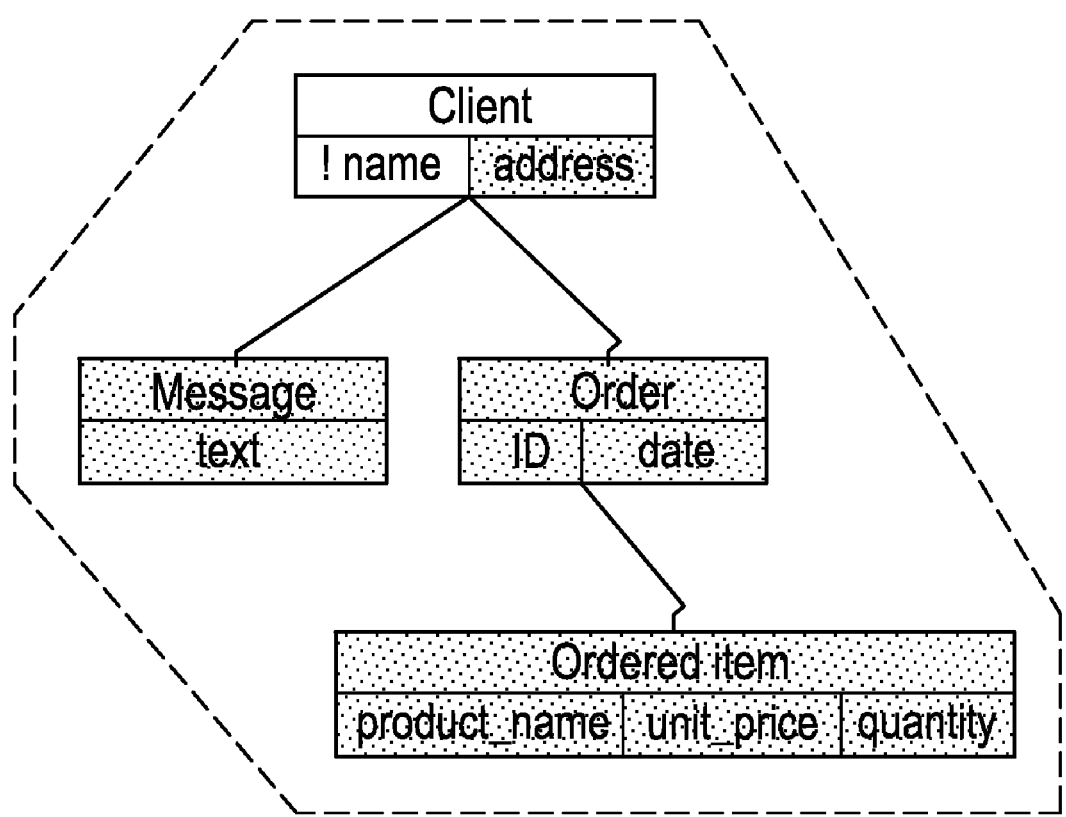
FIG. 32 shows a Mapping Module.

As stated above, the independently produced record trees are partial. But, if we merge these trees properly by matching the "Query" trees with the "Query_1" trees, we will receive a set of complete trees. This is a job for the new and unique "Merging Module" that is an "invisible" part of our EDF Mapping, as it creates the merged data only after Project deployment. See FIG. 32.

Figure 33:
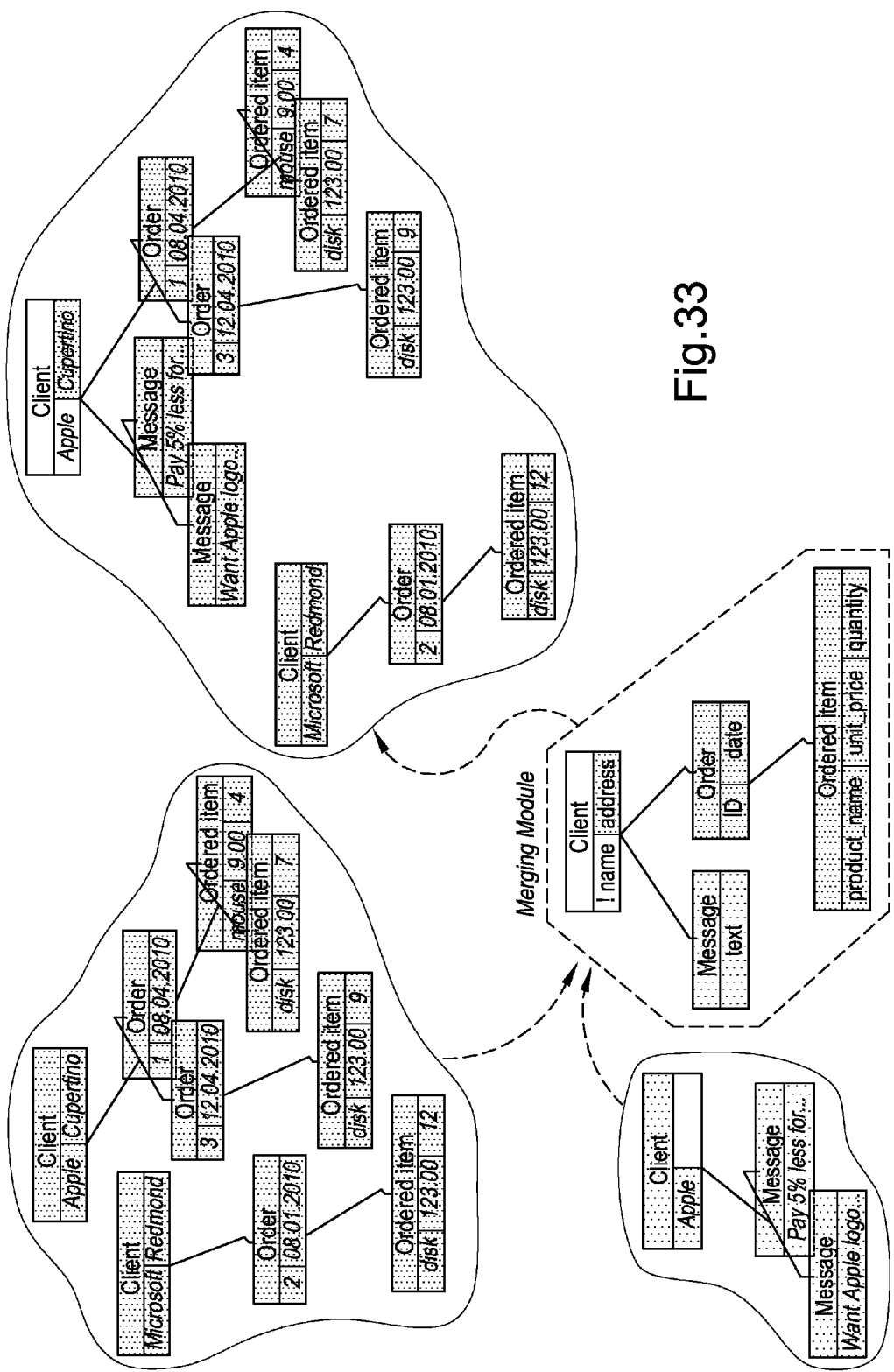
FIG. 33 shows merging of trees.

The Merging Module knows not only which part of the tree format is populated by which EDF Query, but it also knows which part of the tree format is common to both Queries—which in this case is the "Client" node. As the "Client.name" field is appointed a unique key, the Merger uses this field to match and merge the partial trees into complete ones. See FIG. 33.

Fast Hierarchical Enrichment in Aptitude V3.00 comprises the following functionality:

1. Normalization: transformation of a single flat data stream into the set of hierarchical data messages in which the redundancies have been removed.

2. Multiple stream normalization: merging the results of the normalization of many flat data streams into the set of hierarchical data messages.

In Aptitude V3.00, the above functionality is implemented with the following system elements or modules:
1. Input Processor
2. Stream Processors
3. Normalizers
4. Message Mergers
5. EDF Mapping
6. Hierarchical Source in the microflow
7. Fast Hierarchical Enrichment Node in the microflow Fast Hierarchical Enrichment brings the following important advantages:
1. Substantially decreased memory consumption in the processing
2. Major processing speed improvement
3. Decreased usage of database server resources (e.g. connections)
4. Parallel query execution for single EDF Mapping, which allows scalability on database Sources
5. Simplified Aptitude projects—fewer elements needed for the same processing definition
6. Big productivity improvement for developers: an intuitive graphical interface for SQL-aware users for the normalization of flat, unstructured data returned not just by one database query, but by a number of database queries.

We will first discuss in more detail the process of removing redundancies, which process may be regarded as 'normalisation'.

Let's imagine an IT user of Aptitude comes with an SQL SELECT statement—a complex one, but well defined and optimized, perhaps with some hints etc. The user has spent a lot of time writing this statement, and they do not want to change it at all—all they want to do is to use it as a source of data in Aptitude.

For better understanding, a relatively simple sample SELECT statement will be used—as shown in FIG. 34. This example uses 5 tables, A, B, C, D and E where table A for example has columns (or fields) aK, a1 and a2. Column aK is used as the key for creating new instances in the hierarchical data format.

Figure 35:
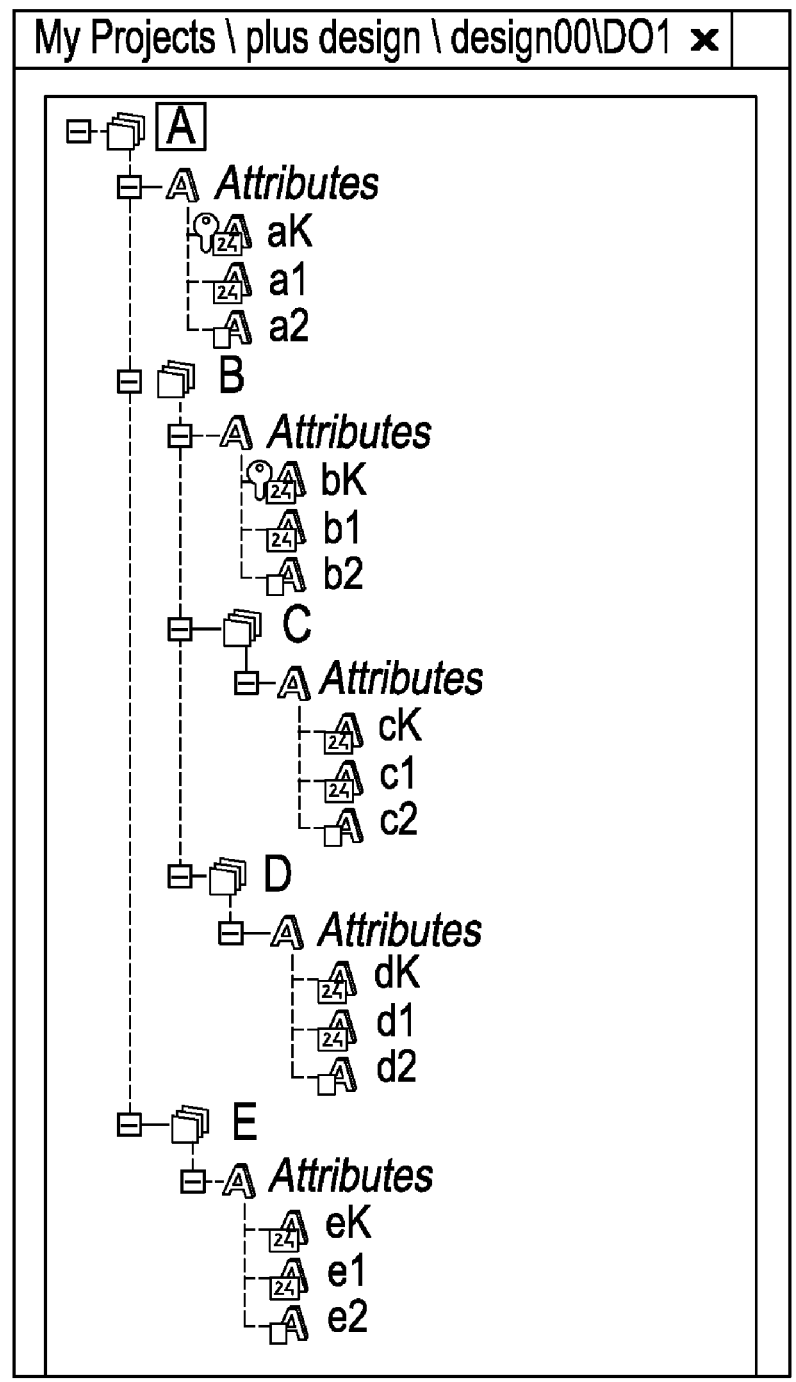
FIG. 35 shows an example form of a Data Object in Aptitude.

On the other hand, there is a business requirement to fetch the data in the hierarchical form of a Data Object ("DO") as shown in FIG. 35.

The IT user should perform the following three consecutive steps to achieve his goal:

Step 1. The IT user should put their SELECT statement as plain text into a database EDF; based on the statement, the EDF's Query graphical representation (i.e. the format of the result set and the parameters) is created almost automatically (functionality available in Aptitude 3.00). See FIG. 36.

Figure 37:
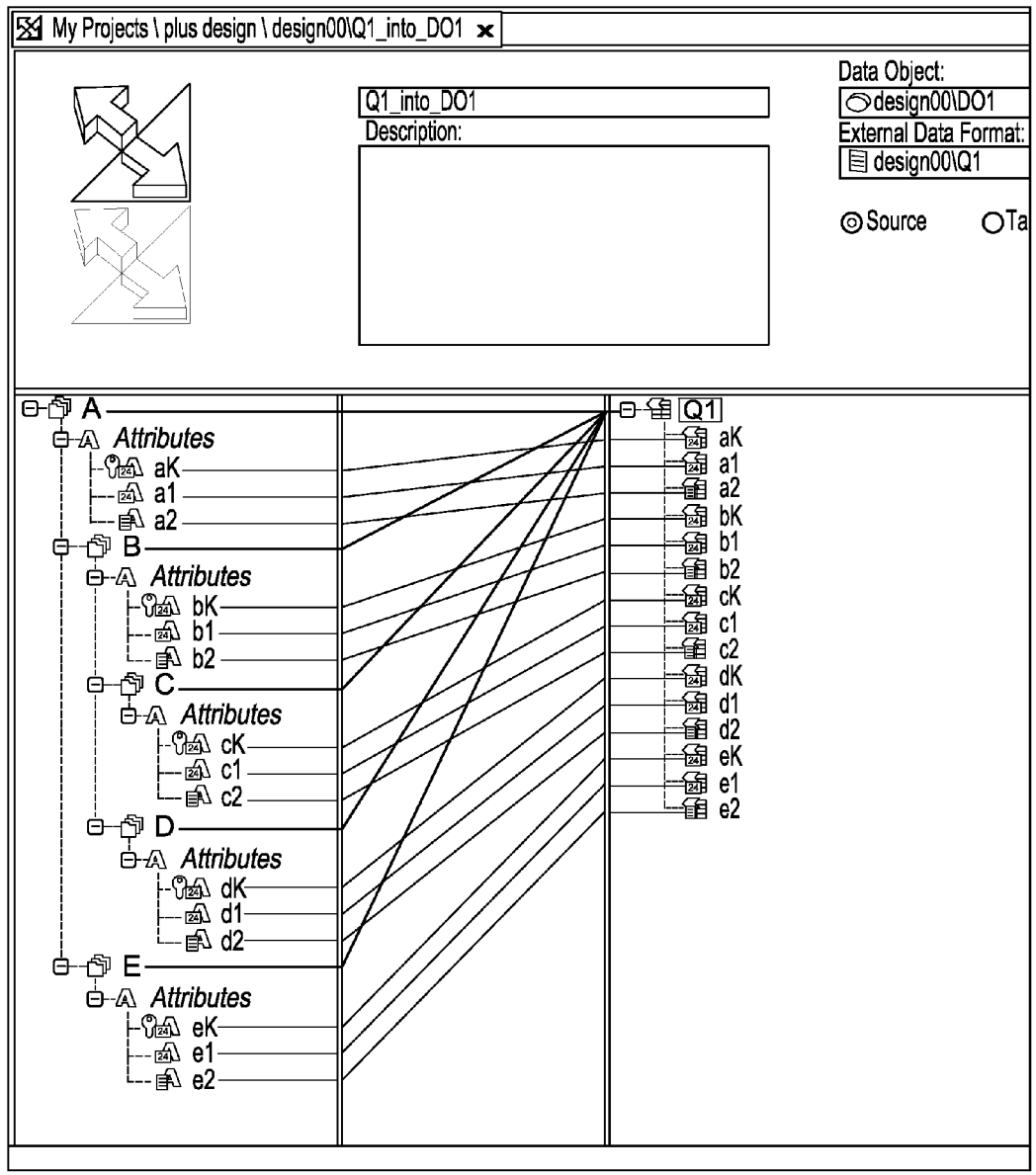
FIG. 37 shows Data Object attributes with a key icon.

Step 2. The IT user should create an EDF mapping that will normalize flat and unstructured data returned by the query. This is where the IT user has some job to do: he must decide which part of the stream of data returned by the query populates which DO-Segment. Then, for each of the mapped Segments, the IT user has to choose one or more mapped DO-Attributes that will comprise a unique key for the Segment. In FIG. 37 are shown the Attributes with the key icon, namely: aK, bK, cK, dK and eK. From a functional point of view, the role of these keys is the same as the Matching Keys in Hierarchy Transformation (HT) (see U.S. Ser. No. 12/648,628) in an "Insert/Update" Segment Link. Unlike in the HT though, a unique key will be not just a set of Attributes, but an ordered set of Attributes. By default, Aptitude will put the key's Attributes in the order taken from Segment definition, but the IT user can change this order so that the key Attribute values are compared in the order that makes the whole matching process as fast as possible.

Note: the fact that a given Attribute comprises a unique key is specified on the Attribute tree control node in the left panel—not in the thin link properties.

Note also that the order of the key's Attributes is specified on the Segment tree control node in the left panel—not in the thick link properties. The key Attributes may not only display the "key" icon, but also their sequence number in the key.

Step 3. The IT user (or business user) should use this EDF Mapping in a Source—as he did before Aptitude V3.00—or in the newly introduced Database Enrichment Node.

Figure 38:
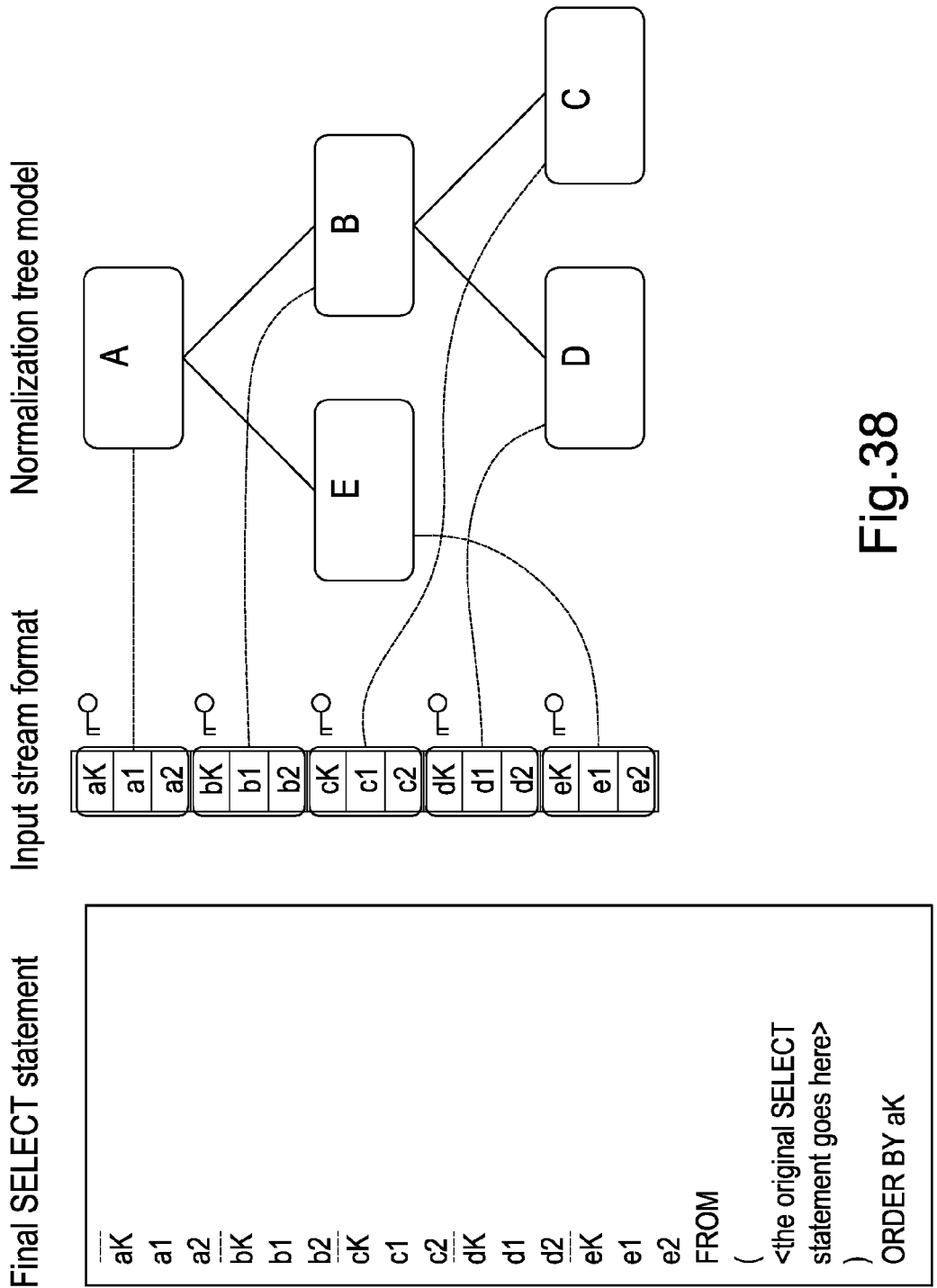
FIG. 38 shows normalization of a tree model.
Figure 39:
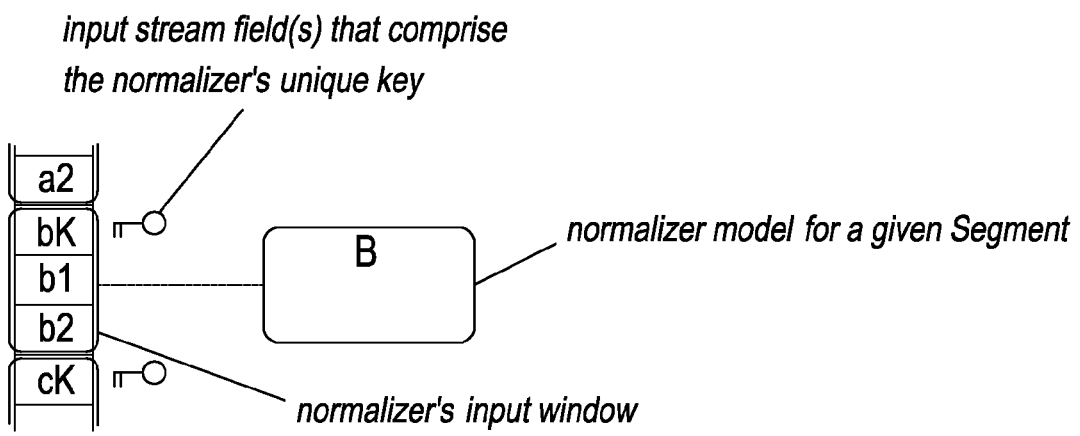
FIG. 39 shows a normalizer model.

In the deployment, the user's SELECT statement is transformed: it is wrapped in an Aptitude-generated SELECT, which—in this example—has "ORDER BY aK" clause at the end of the statement. Additionally, a normalization tree model is generated based on the thick links in the EDF Mapping. This model will be instantiated when in execution. See FIGS. 38 and 39.

A normalization tree model is a tree of normalizer models. The structure of the tree matches exactly the structure of the EDF-mapped Segments. A single normalizer model is comprised of the following components:

an input window: defines which fields of the input stream comprise the normalizer's output—when in runtime, this output produces instances of the mapped Segment. The input window can be identified with the thin links within a single thick link in the EDF Mapping. Normalizers' input windows can overlap.

a unique key: an ordered subset of fields in the input window that in execution will contain values used by the normalizer to generate unique key value.

The execution algorithm can be briefly described as follows:
1. A normalization tree instance is created based on the normalization tree model.
2. An Input Stream Reader opens the input stream (i.e. query is sent to a database for execution).
3. An Input Stream Reader fetches one input record for a single iteration of the algorithm's main loop, so it is enough to create a buffer (i.e. reserve memory) that is able to accommodate one input record only and then reuse it for every fetch until the stream is empty.
4. Once an input record is fetched, a unique key value is created for each of the normalizer models. For all normalizers within the tree, if the new key value used by the given normalizer is not null, and if the normalizer does not have the given key value yet:
a. the new key value is added
b. a Segment instance is created, the Attributes of which are populated as specified by the thin links in the EDF Mapping; this new Segment instance is then assigned to the new key value. Note that it means that the Segment instance and the non-key Attribute values are created only if a new key value comes—this saves time and memory.
c. for each normalizer model that is directly subordinate to this one in the tree model (i.e. for each "child" normalizer), a new empty normalizer instance is created.

Figure 40:
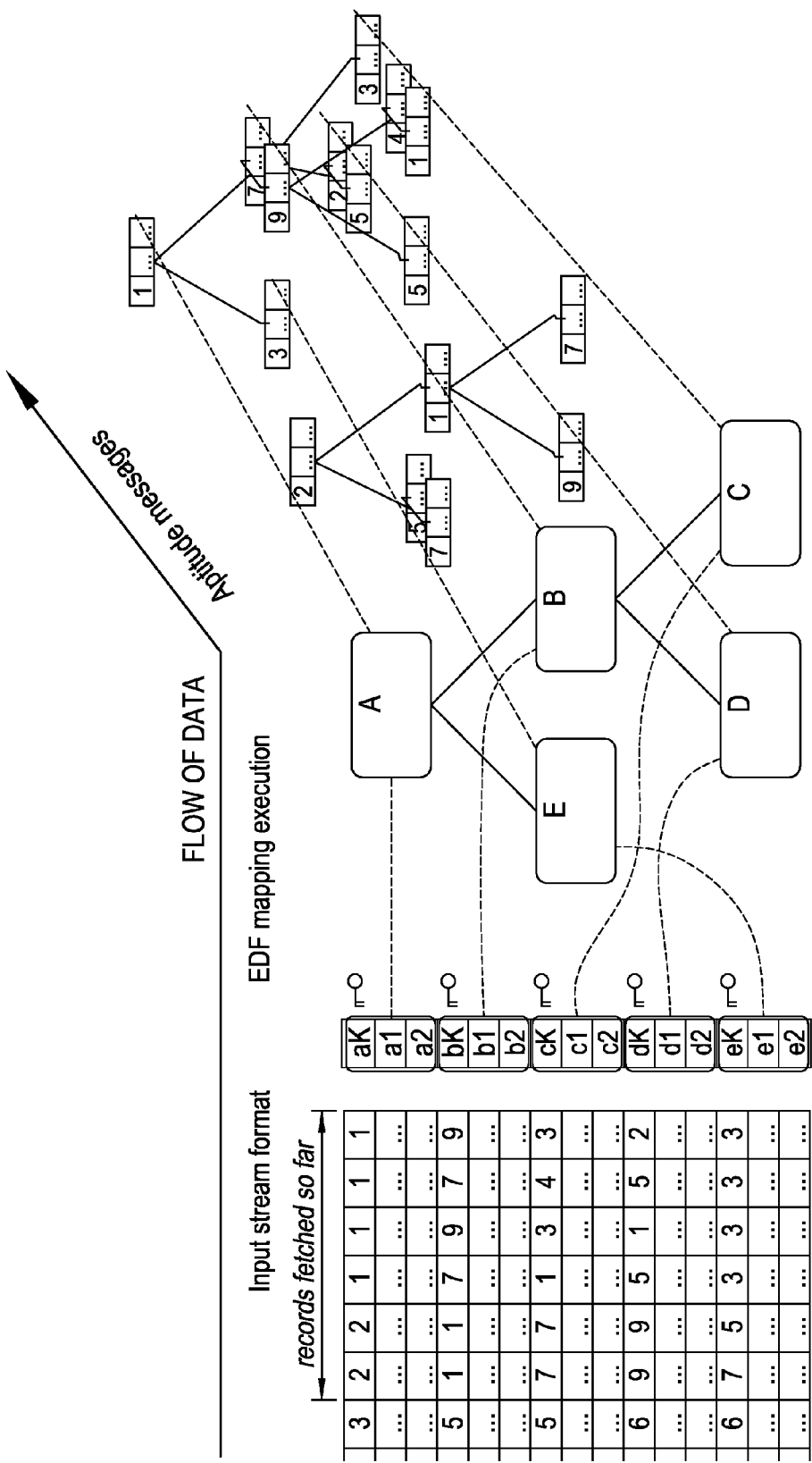
FIG. 40 shows a transformation of data.

FIG. 40 depicts how the data are transformed during the execution. The values of the non-key fields in the input stream and the values of the non-key Attributes in the outbound messages are irrelevant for this discussion and thus are replaced with ellipsis (" . . . ").

Figure 41:
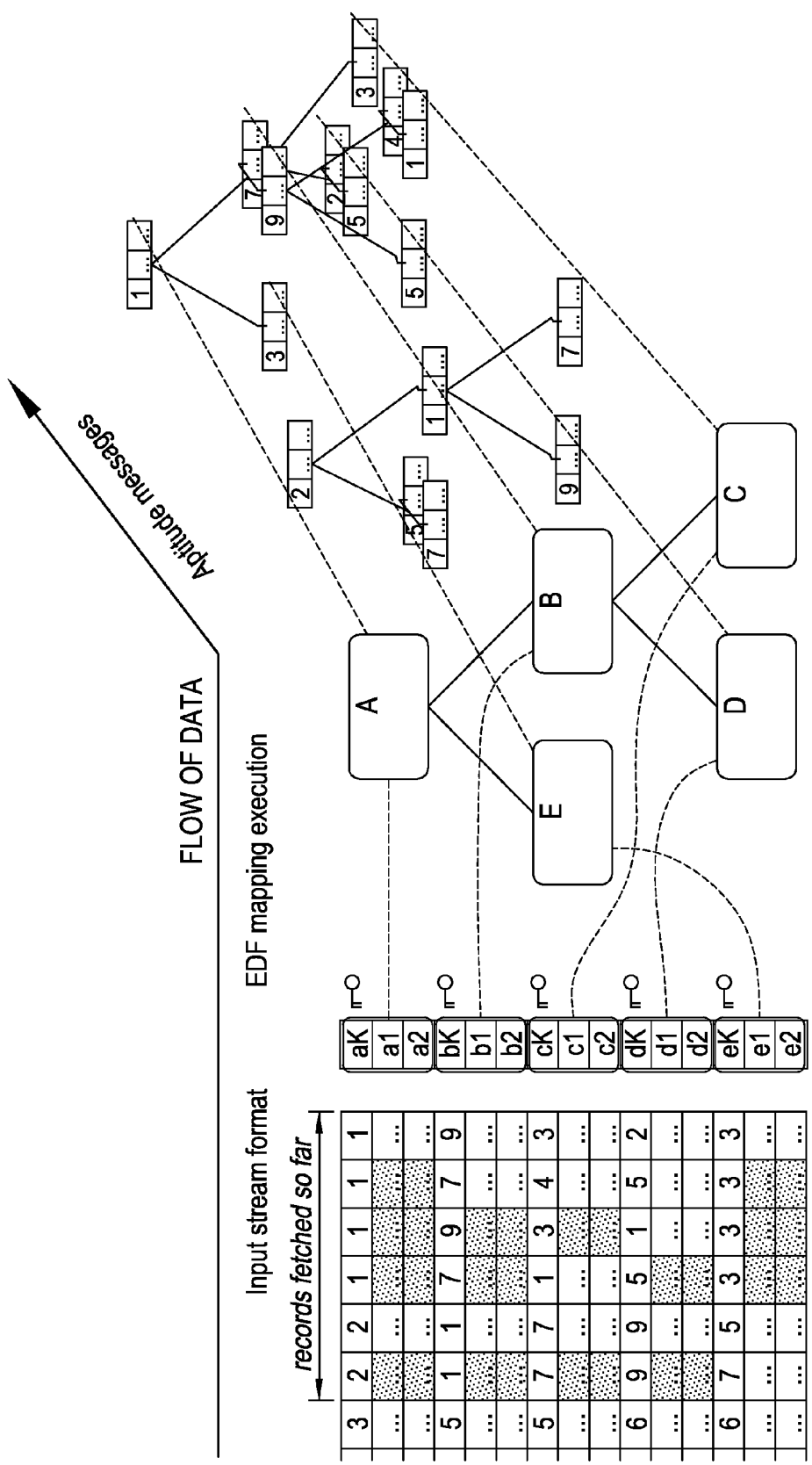
FIG. 41 shows a transformation showing redundancies.

Note that when looking at the outbound Aptitude messages on FIGS. 40 and 41, try to look at them as if they where sketched in a perspective view, where the most distant scene is in upper-right corner of the picture. Also, in these figures an input data stream is shown on the left hand side of each figure, in which each column represents a separate data record, and the data records are read from right to left. Therefore, in FIGS. 40 and 41 the first record to be read is the record which has keys with values 1, 9, 3, 2, 3 and these keys create the corresponding instances of the hierarchical data format shown at the right of the figures.

FIG. 41 is the same as 40, except that it shows the input stream values which are redundant for the execution algorithm (greyed fields) and thus for which values are not created (see point 4.b. in the execution algorithm description above). The redundant data relates to key values which have been repeated. Repeated key values do not create new instances in the hierarchical data format, so the greyed out values are not used and are therefore redundant. The savings in data stream size can be seen easily when comparing the inbound and the outbound data streams: for messages of ID 1 and 2, the inbound stream has 90 fields, where the outbound stream has 48 fields.

The normalization process of a single input stream may be optimized against processing performance if we could assume that the input stream records were grouped by values of unique keys of one or more (preferably all) normalizers in the tree. This splits the concept of a normalizer into two classes: an associative normalizer, which relies on its internal associative container that maps the unique key values to Segment instances (FIG. 42); and a triggered normalizer, which is triggered when the unique key value changes and which assumes that the input stream data is grouped by the unique key values (see FIG. 43).

The associative normalizer does not make any assumptions about whether the keys are grouped or ordered. (Keys may be grouped so that the same keys appear together, without necessarily also being ordered.) The associative normalizer therefore needs to keep track of which key values have already been read, so that it knows each time a new key value appears. The triggered normalizer on the other hand does not need to keep track of which key values have already been read. The triggered normalizer simply needs to look for a change in the value of the key, in which case it creates a new instance in the hierarchical data format. Aptitude knows from the EDF definition which keys are sorted.

In terms of processing performance, the associative normalizer is more expensive than the triggered normalizer. But a triggered normalizer can be used only if the input stream records are guaranteed to be grouped by the normalizer's unique key values. Fortunately, sometimes—for various reasons—the input stream delivered by the device is already grouped by the unique key values by its nature. In the case of a database query for example, this can be an ORDER BY clause in the user's original SELECT statement. Thus, if the user can guarantee that the input stream is grouped by the unique key values, Aptitude is able to make use of that: in the thick link properties dialog window, the user will declare by means of a three-valued radio button if the input stream is:

1. not grouped by the Segment's unique key: this is the default (unless this is the root Segment); this implies the use of associative normalizer, OR 2. not grouped by the Segment's unique key, but the user wants Aptitude to make the stream grouped by unique key by adding an ORDER BY clause in the wrapping SELECT statement: this is the default for the root Segment; this implies the use of triggered normalizer, OR 3. guaranteed to be grouped by the Segment's unique key: the user guarantees that their SELECT statement returns records grouped by the Segment's unique key; this implies the use of triggered normalizer.

There is a number of simple, but very important constraints the user must be aware of:

1. Within a single query in EDF, options 2. and 3. cannot be used at the same time. For example, a situation when one thick link has option 2. and another one has option 3. is not allowed. This is because option 2. generates an ORDER BY clause that would compete with the possible ORDER BY clause in the original SELECT as specified by option 3. This constraint will be guarded by the deployment process.

Figure 45:
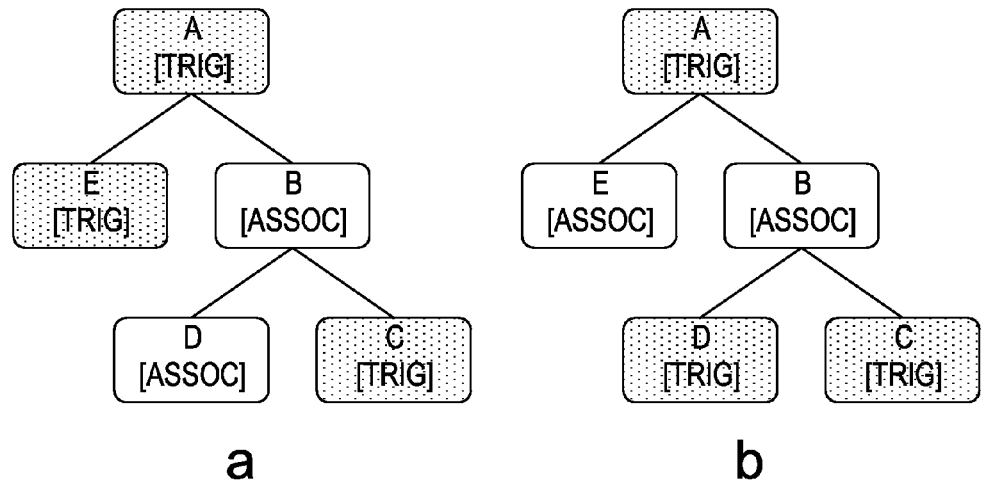
FIG. 45 shows an incorrect configuration of a normalizer tree.

2. Within a single query in EDF, when any option other than 1. of the three above is picked for more than one thick link, then all these links should form a Segment path rather than a Segment tree. In other words, any random pair of triggered normalizers within a normalization tree must be in "ancestor-descendant" relationship—not "sibling" relationship (see FIGS. 44 and 45). This constraint will be guarded by the deployment process.

The sample settings in FIGS. 44*a*, *b* and *c* will deploy successfully. For the sample settings shown in FIGS. 45*a* and *b*, a deployment error will be raised.

3. Within a single query in EDF, when the user picks option 3. for more than one thick link, they must be aware that the grouping (or sorting) fields' priorities in the original SELECT statement (usually in the ORDER BY clause) must match the hierarchy of the normalizers in the tree. In our simple example given above, if the user picks option 3 for thick links B and C, then the user's original SELECT should contain "ORDER BY bK, cK", but not "ORDER BY cK, bK". This constraint will not be guarded by the deployment process.

The user should always try to create as many triggered normalizers as the input stream allows to ensure maximum processing efficiency. If there is more than one Segment path to choose from, the user should pick the one that is likely to hold the biggest number of Segment instances in total during processing, which is not necessarily the longest path.

When the user realizes that the mapped Segments make a tree rather than a list, and more than one Segment path in this tree is likely to contain a "one-to-many" relationship between some parent Segment and its child Segment, than it may mean that the user's original SELECT is constructed in such a way that it returns a Cartesian product, which will usually multiply the length of the input stream. If this is the case, it is strongly recommended that the user do one of the following:

split the original SELECT into two or more SELECTs (one SELECT per "one-to-many" path) with the same format of resultset and join them with the UNION ALL clause, or split the original SELECT into two or more SELECTs (one SELECT per "one-to-many" path), put those SELECTs into EDF as separate queries and map them to the Data Object in the EDF Mapping (the use of more than one query with a single EDF will be discussed in detail later).

In our simple example given above, if we assume that all the "root-to-leaf" paths contain a "one-to-many" relationship and the user picks the second option of the two above, then the user should create and map three queries in the EDF:

one mapped to the "/A/B/C" path, populating all Attributes on the path, one mapped to the "/A/B/D" path, populating all Attributes of D and the key Attributes for the rest of the path, one mapped to the "/A/E" path, populating all Attributes of E and the key Attributes for the rest of the path.

Note that in such a case all the normalizers in the three queries could be of type "triggered".

There is one more class of normalizer—the fastest one—that can be created when all of the following conditions are met:
1. the normalization tree is degenerated down to a list: that guarantees the "leaf" Segment instances will not need to be merged when normalizing a single stream (as data for such a leaf will occur in the input stream only once), and
2. the Segment populated by the leaf normalizer in such a degenerated tree is not populated by any other query in the EDF (the use of more than one query with a single EDF will be discussed in detail later): This guarantees the Segment instances will not need to be merged in the Message Merger (Message Merger will be discussed later).

Figure 46:
FIG. 46 shows an icon of a sequenced normalizer.

In such a situation the "leaf" normalizer (which is the only leaf in such a degenerated tree) can be of class "sequenced" (FIG. 46).

This class of normalizer is the fastest one as it does not require any unique key. So if the above conditions are met for a Segment, the user does not have to set any key Attribute for the Segment and, it is by not setting any key Attribute for the Segment, that the user determines the use of a sequenced normalizer.

Figure 47:
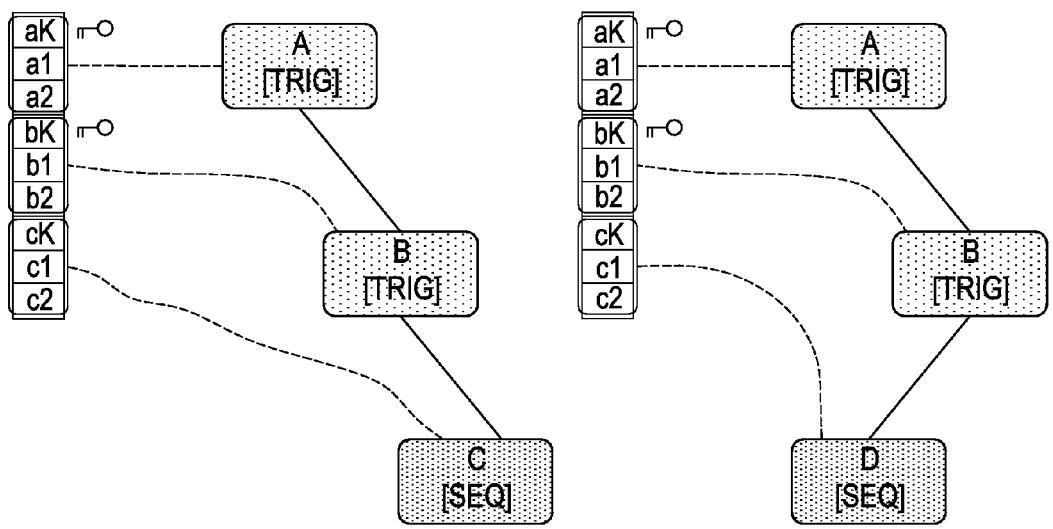
FIG. 47 shows an illustration of use of sequenced normalizers.

In the example of FIG. 47 a sequenced normalizer is used for segment C because there are no keys used for C and there is assumed to be no redundancy in C. A new instance of C is created for each record.

FIG. 47 shows the use of sequenced normalizers for two queries in a single EDF mapping. Note that no key fields are set by the user for normalizers C and D—if there were any, then those normalisers would be of type "associative".

Note that the input stream grouping settings set on a thick link have no effect on the choice of normalizer type in the situation described above—the lack of key Attributes is enough to imply the use of a sequenced normaliser.

Figure 51:
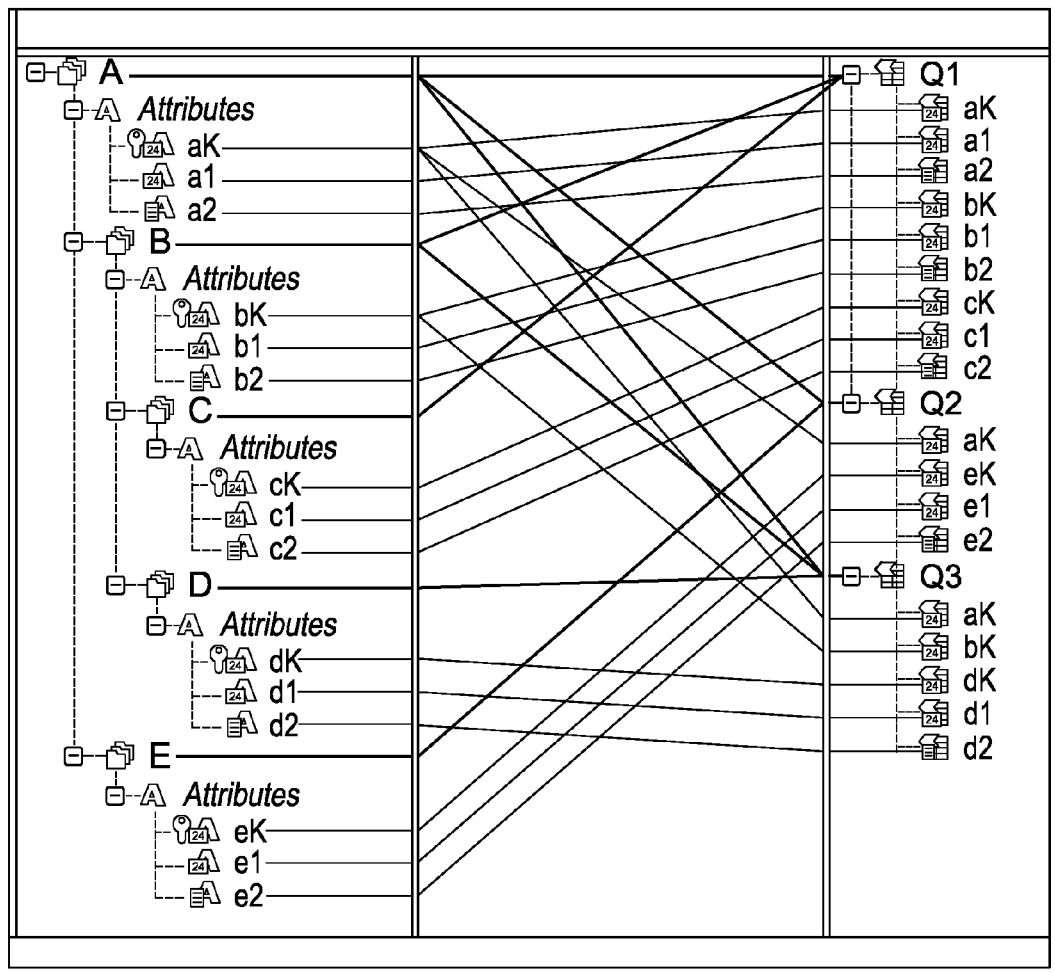
FIG. 51 shows an EDF mapping.

Let's take our simple example again and assume the user is aware of the threat of the Cartesian product and followed the latter of the two recommendations given above:
1. The user creates three SELECT statements as below. Note that the non-key columns are not duplicated across the result sets of the SELECTs, this is only the key columns that are present in all statements, as they are required for normalization.
For path "/A/B/C" see FIG. 48.
For path "/A/E" see FIG. 49.
For path "/A/B/D" see FIG. 50.
2. Within a single EDF, the user puts each of the SELECTs as an EDF Query.
3. The user maps all the queries in a single EDF Mapping:
a. Only non-leaf Segments (A and B) have their unique keys specified—leaf Segments (C, D, and E) do not.
b. The input stream grouping settings on the non-leaf thick links point to option 2. See FIG. 51

Figure 52:
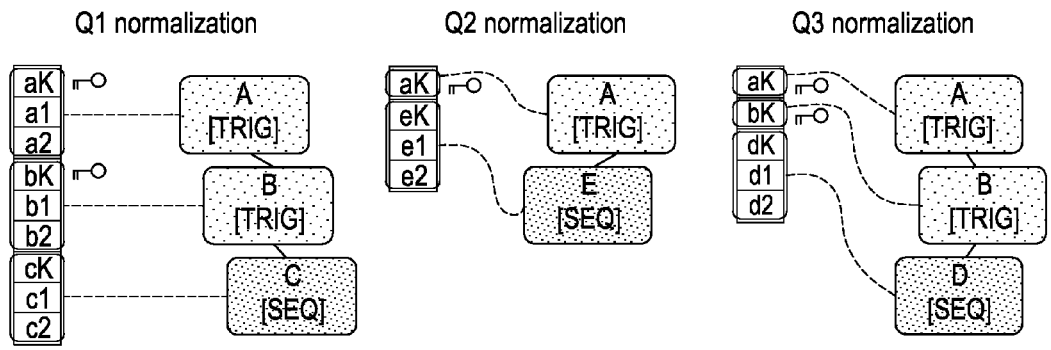
FIG. 52 shows normalization of tree models.

Thus the resulting normalization tree models look as depicted in FIG. 52.

Figure 53:
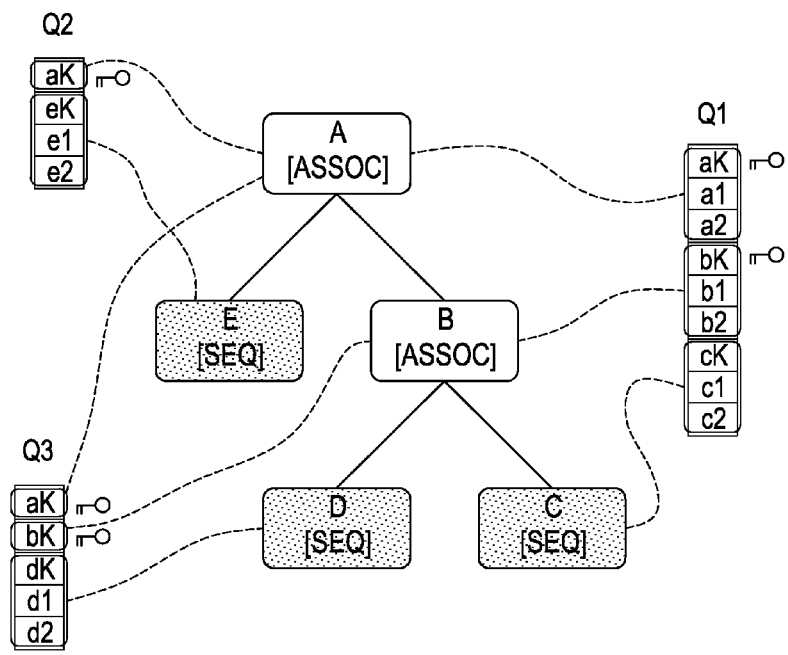
FIG. 53 shows a process of building outgoing messages.

Now we have three concurrent, independent input streams, each of them read by an independent Input Stream Reader. Each of these streams has its own, independent normalization tree model, which can produce a stream of Aptitude messages. These three streams of Aptitude messages are mutually complementary—we need to merge them into one stream by matching and merging Segment instances from different streams by means of the unique keys. This can be achieved in one of the two ways: Approach 1. When in execution, the three input streams share a single normalization tree instance that is the sum of the three individual smaller tree models. The final, complete, outgoing Aptitude messages are built concurrently by the input streams. See FIG. 53.

This approach is quite natural, but it has one important disadvantage: as stated above, the three input streams and their tree models are functionally independent, thus they could be executed in parallel, each using its own, individual database connection. And if the normalization tree instance is shared amongst two or more concurrent processing threads, some means of synchronization is required, which will have a big impact on scalability as the nomalizers will be accessed very frequently during processing, in addition to the cost of calling the synchronization mechanisms themselves. Additionally, normalizers for A and B will have to be of type "associative", as data grouping is done within each stream individually, but not across all the streams together.

Figure 54:
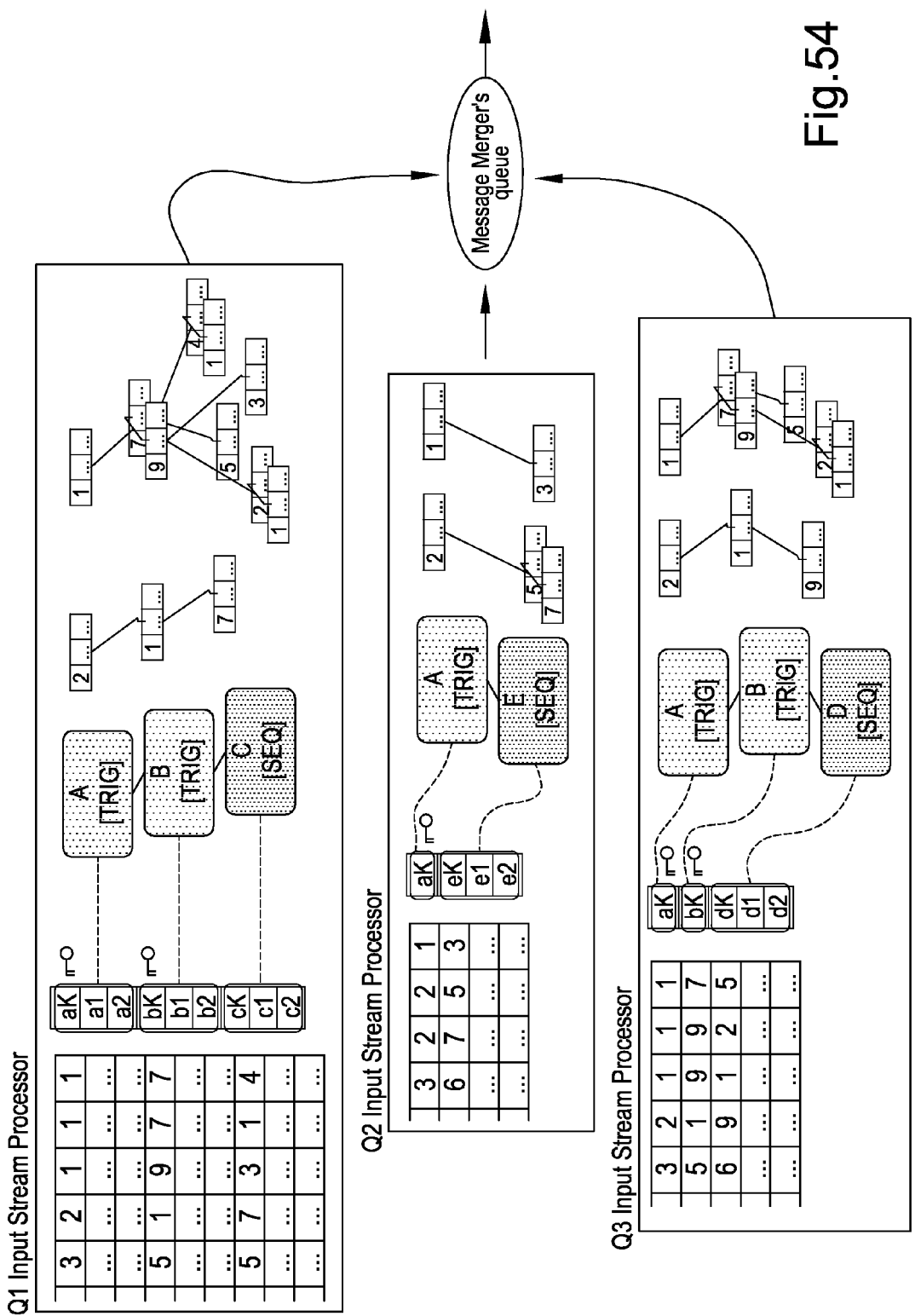
FIG. 54 shows merging of trees.
Figure 54:
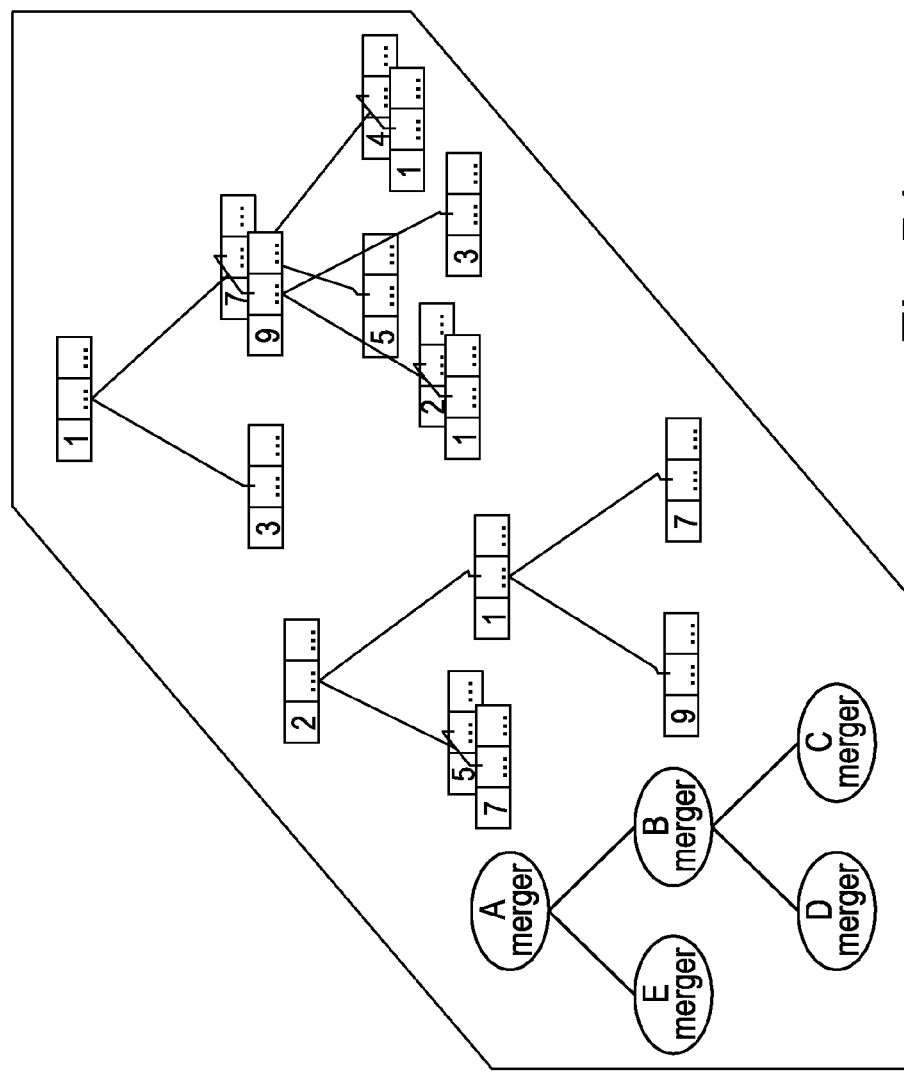

Approach 2. When in execution, each of the three input streams has a "partial" normalization tree instance of its own and produces its own, "partial" Aptitude messages. Let's give a name to a single "Input Stream Reader-normalization tree instance" couple: an Input Stream Processor. When a single Input Stream Processor completes construction of a single "partial" Aptitude message, it will put it on a special queue together with the message's normalization tree instance that has been built along with the message. A special module called Message Merger—which can run in parallel with the Input Stream Processors—will read from that queue and merge the messages from different Processors as specified by the unique key, exploiting the information collected in the "partial" normalization tree instances. See FIG. 54.

The second approach causes the key value-matching process to be duplicated: the first time it is done in a local, "partial" normalization tree, and the second time in the Message Merger's merging tree. On the other hand though, such approach limits the need for synchronization of the access to the Merger's queue to, a short moment when a pointer is being put onto or taken from the queue—which is very rare and quick when compared to the time needed to access a normalizer. In this case, the advantages that comes from avoidance of frequent synchronization far exceeds the disadvantage of double matching. Thus, this approach was implemented.

Note that when in execution, the Message Merger module will not be present when only one query is mapped in the EDF Mapping (as there is nothing to merge).

Let's assume that the user has only one query (i.e. single input stream) and for the root thick link they picked the first of the three options described above. That means the root Segment data is not grouped by its unique key values and we need to wait for anof "end of stream" signal before we can send the buffered Aptitude messages to the output. This would usually occupy large amounts of memory and would hold up the processing till the "end of stream" signal is sent. This is not acceptable and thus the first of the options discussed before will be unavailable when using the root level thick link. This constraint will be enforced by the deployment process, but will also be enforced by Aptitude Studio.

When there is more than one query (i.e. input stream) mapped in the EDF Mapping, it is not enough to make sure that the root Segment data is grouped by its unique key as, for a given key value, in one stream the data can be located at the end of the stream whereas in another one they can be at the beginning. In such a case the Message Merger module will have to wait for the "end of stream" signal from all the Input Stream Processors before it can send the buffered messages to the output. A remedy to this is to make sure that the data in all the streams are not only grouped by the root unique key, but also sorted by this key. Based on this assumption, the Message Merger Module can deduce if one or more messages stored in its buffer are complete and can be sent to the output by performing the following routine:

For each message in the buffer: if each of the Processors has put on the Message Merger's queue a message with a root unique key value greater than the value of the given buffered message, then there will be no more data for the buffered message and thus this message can be stripped of the normalization tree instance and sent to the output.

To achieve the above, the following constraint must be introduced: if there is more than one query mapped in the EDF Mapping and for one or more root thick links the user picked option 3, then the user should state by means of a check-box on the EDF Mapping screen, that all the streams of root data are not only grouped, but also ordered by a root unique key. This constraint will be enforced by the deployment process.

The next section defines differences between the old and new Aptitude and I am not sure this should be included. I have deleted it here.

Figure 55:
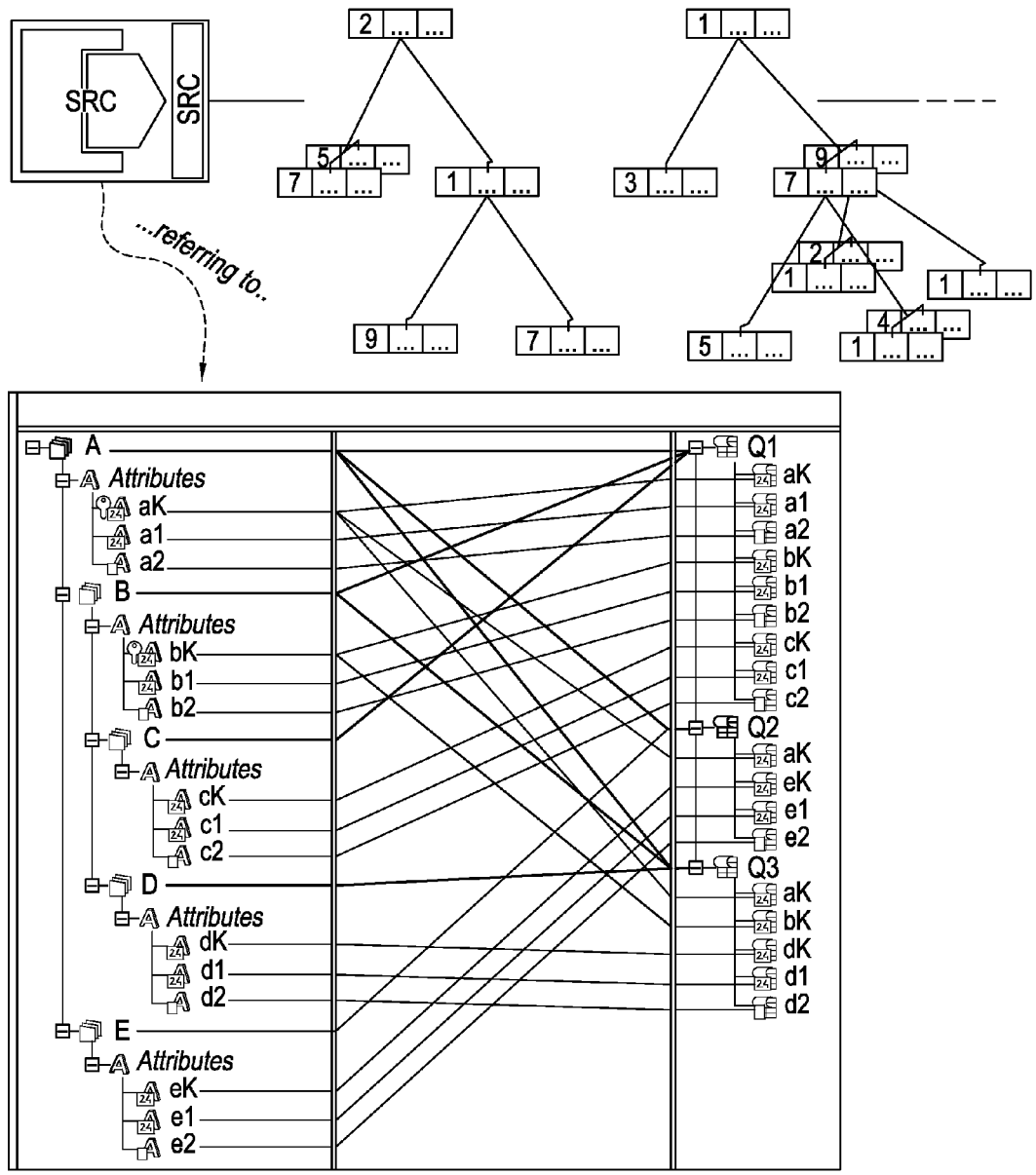
FIG. 55 shows triple query EDF mapping.

FIG. 55 depicts the use of the sample "triple-query" EDF Mapping in a database Source.

An Enrichment Node will be defined as follows:
1. An Enriched Data Object, which defines both input and output of the node.
2. An Enriched Segment path within the enriched Data Object that will point to the root of an embedded Data Object. This embedded Data Object must be the Data Object returned by the chosen EDF Mapping (see point 3). When processing, Segment instances that are right above the end of such a path will be enriched with the messages returned by the chosen EDF Mapping (see below).
3. An Hierarchical source EDF Mapping producing the enriching messages.
4. A Database Device.
5. An Attribute-to-Parameter mapping: a grid comprised of the following columns:
a. A Parameter name
b. A Parameter Aptitude data type in read-only mode.
c. An Enriched Data Object's Attribute path relative to the Segment path that ends right above the last step in the enriched Segment path (specified in point 2).
Constraints (will be enforced by the deployment process):
1. The EDF Mapping must of a "hierarchical source" type.
2. Mapped Attributes must be of the same Aptitude data type as the corresponding Parameters.
3. The end of the enriched Segment path must point to a reference to the Data Object used in the EDF Mapping.

We now give an example of 'triple-query' EDF Mapping usage in the Enrichment Node.

Figure 56:
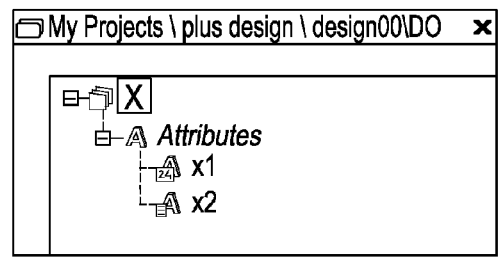
FIG. 56 shows data returned by a triple query.

The user has a Data Object as below and he wants to enrich its messages with the data returned by the "triple-query" EDF Mapping. See FIG. 56.

Figure 57:
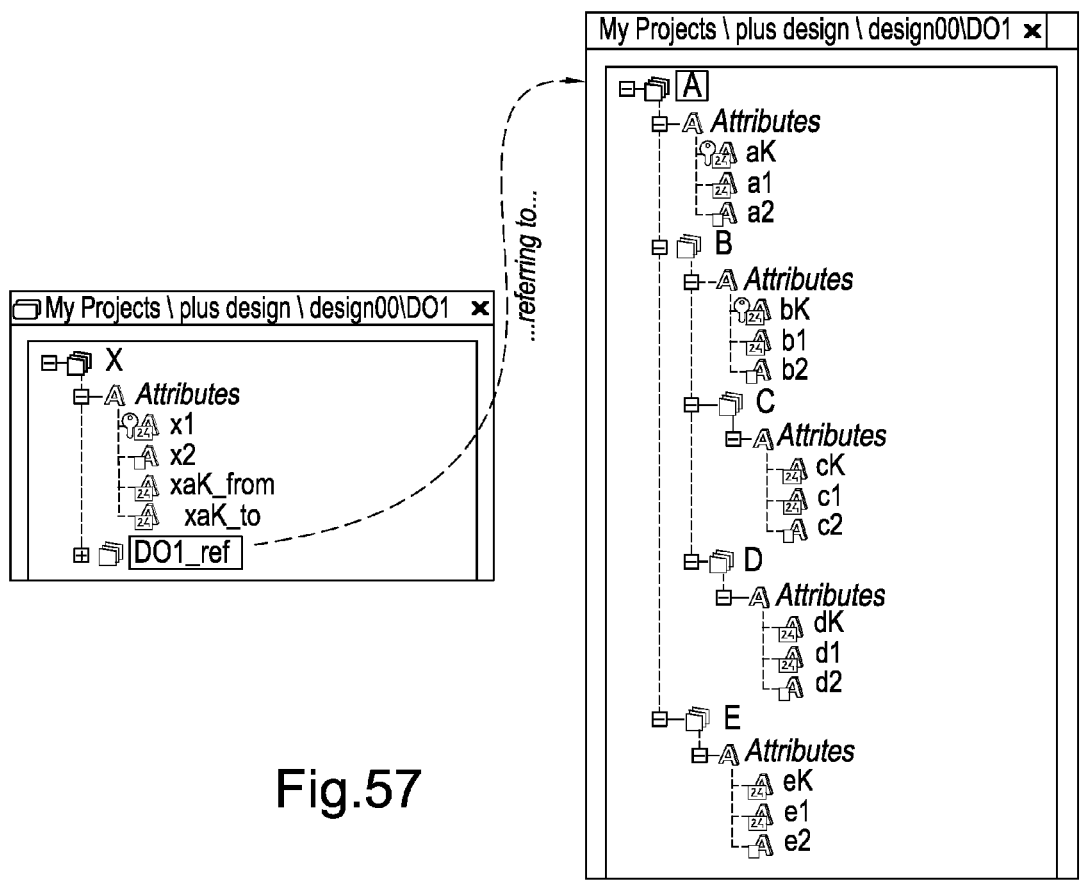
FIG. 57 shows adding of attributes.
Figure 58:
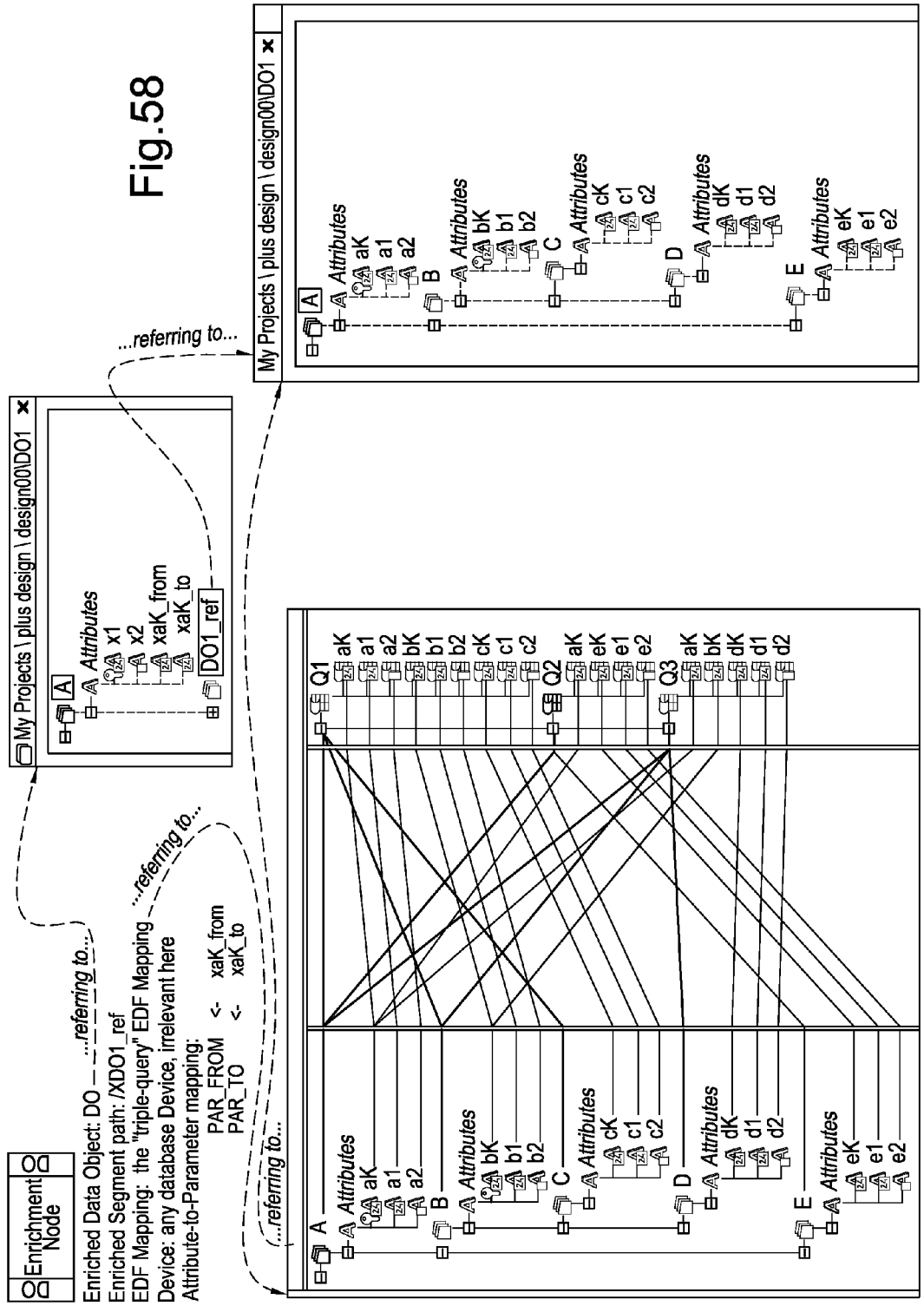
FIG. 58 shows a creation of an enrichment mode.

The solution is as follows
1. The user should extend the structure of the Data Object to be enriched by adding a reference to the Data Object returned by the EDF Mapping. Additionally, the user might want to add Attributes that will carry the values for query Parameters in the EDF, unless such Attributes already exist in the original Data Object. In the case of the example (FIG. 57), there are two Parameters in the queries: "PAR_FROM" and "PAR_TO", and for those Parameters two Attributes will be added: "xaK_from" and "xaK_to".
2. The user should create an Enrichment Node defined as shown in FIG. 58.

Figure 59:
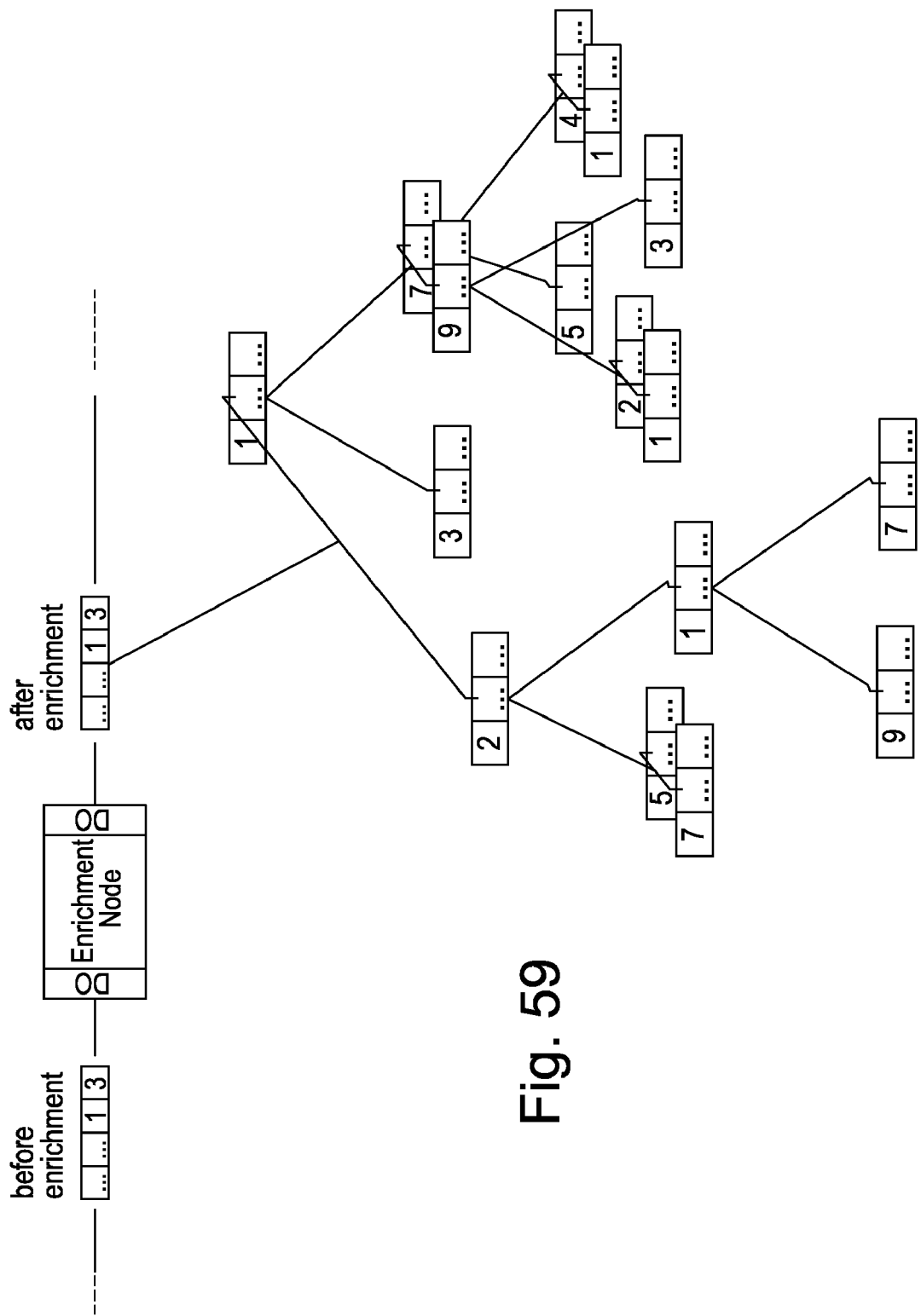
FIG. 59 shows an output of trees using an enrichment node.

FIG. 59 depicts the effects of execution of the Enrichment Node defined above. The values for Attributes "x1" and "x2" are irrelevant here and are replaced with ellipsis.

The main component responsible for Fast Hierarchical Enrichment is a re-usable component called Input Processor.

The Input Processor contains a set of Stream Processors and a Message Merger.

A Stream Processor is responsible for processing the result set of a single query. It contains a single Stream Reader and a set of Normalizers organized in a Normalizers Tree.

A Message Merger obtains "incomplete" messages, each originating from a single Stream Processor and creates a single, complete message from them.

Regardless of the use case (Source Object or Enrichment Node), the Input Processor can operate in several modes with regard to the use of the resources like database environments, database sessions and threads.

In general, the modes are Parallel or Sequential.

Figure 60:
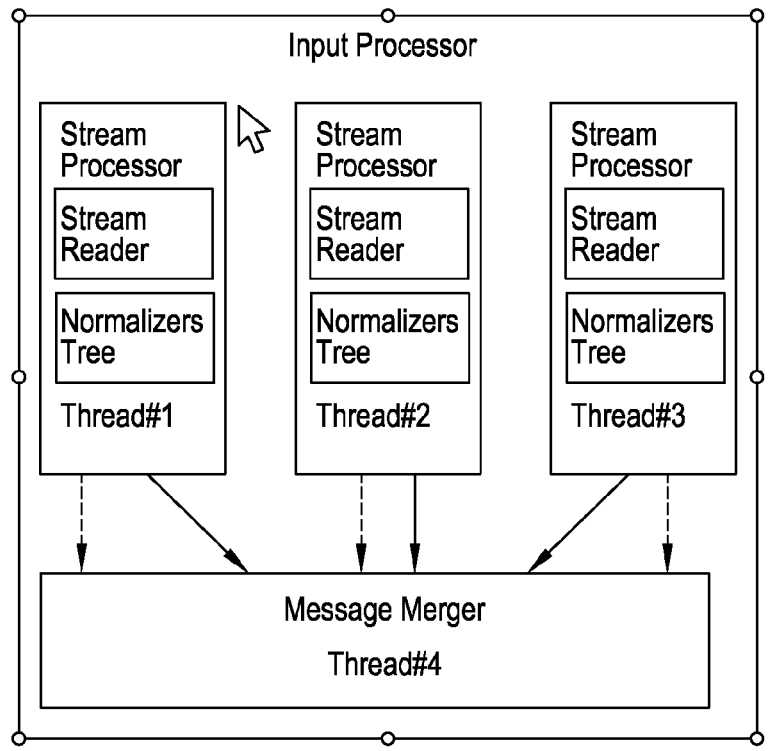
FIG. 60 shows parallel processing.
Figure 61:
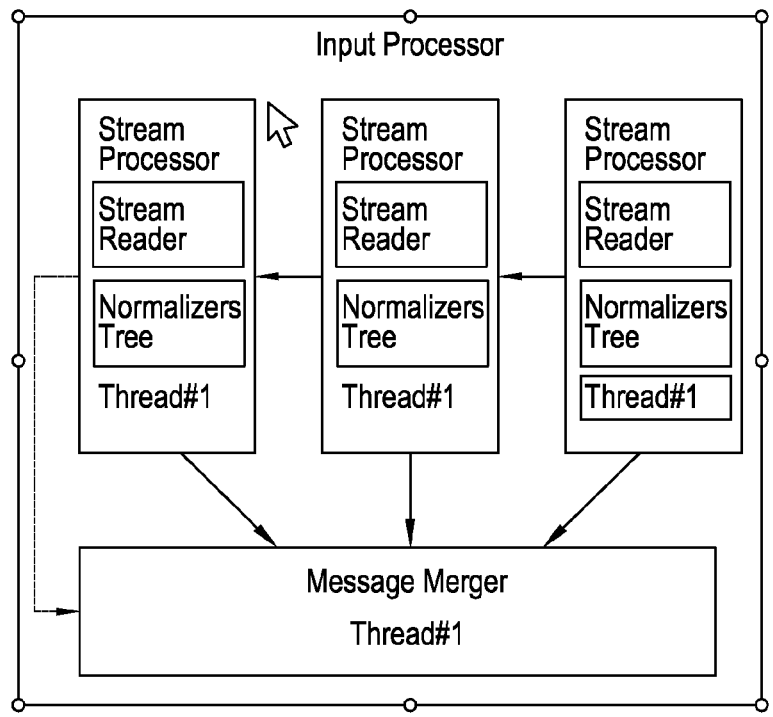
FIG. 61 shows sequential processing.

Please refer to FIGS. 60 and 61 and to the following description for details.

The solid lines define the flow of data between components.

The dashed lines depict the parallel or sequential execution sequence of components. Additionally, the thread numbers have been shown, to identify the thread executing each component.

When used in a Database Source, the Input Processor can operate in several modes with regard to the use of the resources such as database environments, database sessions and threads:

Parallel Stream Processors Mode—this mode offers the highest performance, but is the most resource-consuming. Moreover, it is only applicable in OLAP-like scenarios, when the input data is static, i.e. not modified by the Targets or external systems, as in this mode the operation of each individual Stream Reader takes place in a separate transaction. Thus, on live, varying data, the data inconsistencies are possible.

Each Stream Processor operates in a separate Thread.
Each Stream Reader has its own Database Environment and its own Database Session.
The Message Merger operates in a separate Thread Sequential Stream Processors Mode—this mode reads chunks of data from all Stream Readers sequentially. Thus, all Stream Readers can and do operate on the same session. The advantages of this mode are firstly, that it saves Resources (Threads/Database Environments/Database Sessions) and, secondly, that all Stream Readers operate in one Session, and thus in one Transaction. This allows the use of this mode on non-static, non-OLAP-Data, e.g. on OLTP-Data. A significant limitation to this mode occurs when the Database does not support Statement Overlapping, i.e. the interleaving of Row Set Fetches among multiple Statements in the same Session. An example of a Database, that does not support Statement Overlapping is Sybase.

Each Stream Processor operates in the same Thread.
Each Stream Reader has the same Database Environment and the same Database Session.
The Message Merger operates in a separate Thread or in the same Thread as the stream Readers do.

Clustered Parallel Stream Processors Mode—this mode resembles the Parallel Stream Processors Mode, but it differs with in that some Stream Processors may execute in parallel and others sequentially. The main advantage is that the user is able to enforce the sequential execution of some Stream Processors/Readers in the same Thread/

Environment/Session. It is particularly useful when there are Streams known to return very little data. Such Clustering then saves Resources (Threads/Environments/Sessions) without significantly degrading performance.

When used in Enrichment Node, the Input Processor can operate in several modes with regard to the use of the resources like database environments, database sessions and threads:

Parallel Stream Processors Mode—this mode offers the highest performance, but is the most resource-consuming. Moreover, it should only be applicable in OLAP-like scenarios, when the input data are static, i.e. not modified by the Targets or external systems, as in this mode the operation of each individual Stream Reader takes its place in a separate transaction. Thus, on a live, varying data, the data inconsistencies are possible. In particular, in this mode the Enrichment Node operates effectively outside the ETR (i.e. Execution Transaction Region) transaction.

Each Stream Processor operates in a separate Thread.

Each Stream Reader has an own Database Environment and an own Database Session, different from the ones shared within ETR.

The Message Merger operates in its own, separate Thread.

Sequential Stream Processors Mode—this mode reads chunks of data from all Stream Readers sequentially. Thus, all Stream Readers can operate on the same session, and, in fact, they do. The advantages of this mode are, firstly, that it saves Resources (Threads/Database Environments/Database Sessions) and, secondly, that all Stream Readers operate in one Session, and thus in one Transaction. This enables using this mode also on non-static, non-OLAP-Data, e.g. on OLTP-Data. A significant limitation to this mode occurs when given Database does not support Statement Overlapping, i.e. the interleaving of Row Set Fetches among multiple Statements on the same Session. An example of a Database, that does not support Statement Overlapping, is Sybase.

Each Stream Processor operates in the same Thread, the ETR Thread.

Each Stream Reader has the same Database Environment and the same Database Session, and these are the same Database Environment and the same Database Session that are shared within ETR.

The Message Merger operates in the ETR Thread.

This means, that the operation of Enrichment Node's main loop in ETR Thread will look as follows:

```
StreamReader[1].readUntilKeyChange( )
...
StreamReader[i].readUntilKeyChange( )
...
StreamReader[n].readUntilKeyChange( )
MessageMerger.merge( )
```

Clustered Parallel Stream Processors Mode—this mode resembles Parallel Stream Processors Mode, but it differs with an exception, that some Readers may execute in parallel and some others—sequential. The main advantage is, that the conscious user is able to enforce the sequential execution of some Readers in the same Thread/Environment/Session. It would be particularly useful for the Streams known for returning little data. Such Clustering would then save Resources (Threads/Environments/Sessions) without significantly degrading performance.

The objects created after the deployment of enhanced EDF Mapping are abstract in the sense that they do not refer to a particular type of the device that delivers the input stream. For instance, term "input data stream" is used interchangeably with "query" or "query resultset". This is because the functionality is designed to cope with any kind of device that returns a continuous stream of flat data—this may be a database query, but could also be an operating system file, etc.

Using Normalizer Statistics To Verify User Assumptions Concerning 1:N-Relations-Cardinalities: As was stated at the end of the section concerning Tuning the Normalizers: "If there is more than one Segment path to chose from, the user should pick the one that is likely to hold the biggest number of Segment instances in total during processing (which is not necessarily the longest path).".

This means, that the user must know (or be able to estimate) the structure of the data to be processed, in particular he must know the 1:N-Relations-Cardinalities for each thick link.

If these estimates can be estimated correctly, then a competent, SQL-aware user is able to write optimal queries covering the entire normalization tree. However, when these estimates do not conform with the reality, then the statements comprising the Enrichment Plan will be non-optimal. To facilitate the user writing the optimal Enrichment Plan, several options are provided. All of them are based on Expected Cardinality defined for each thick link and on gathering statistics for the actual Cardinality, performed within Normalizers/Message Merger. Should the actual Cardinality differ "too much" from the 'Expected Cardinality", the user is displayed an appropriate warning.

Studio-Level Statistics Gathering and Verification:

The facility to verify the normalizing EDF Mapping in Aptitude Studio is a preferred option for most users. Still before deployment, the user can manipulate different structures of the Enrichment Plan, run it via OLEDB in Aptitude Studio, gather statistics, compare the Measured and Expected Cardinalities and decide which Enrichment Plan to choose.

Normalizer/Message Merger-Level Statistics Gathering:

Should the Measured Cardinalities at production time significantly differ from the Expected Cardinalities at design time, the user will be given the opportunity to gather Statistics at run time within the Normalizers/Message Merger, and display an appropriate Warning Message. This allows the user to re-write the queries optimally.

Using Normalizer Statistics to automatically optimize the Fast Enrichment Execution Plan:

Using Correlated Database Tables/Views/Queries (see above), a Hierarchical Data Object, and an appropriate Mapping with Expected Cardinalities on thick links, the Statement Compiler is able to automatically generate an Enrichment Plan (i.e. the queries covering the normalization tree) that are optimal with respect to these Expected Cardinalities. However, when the Measured Cardinalities significantly differ from the Expected Cardinalities, the user can modify the Expected Cardinalities to be equal to the Measured values and re-deploy a Project or a Project Element. Then the Enrichment Plan will be rebuilt.

We summarise some distinctive features below:

1. Normalization of flat stream of records into a stream of record trees (see the concept of a Stream Processor):

a. The user models the normalization routine by graphically mapping the flat stream format onto a tree format where the nodes of the tree format have some scalar components appointed to be normalization unique keys. Additionally the user can specify whether the flat stream is already grouped by one or more normalization unique keys (which will speed up the processing in runtime).

Several normalization modes are defined and accessible.

b. In runtime, the user-modelled normalization routine transforms flat records into trees of records. This transformation gives the following benefits:

i. saves memory due to getting rid of redundancies that are typical for resultsets delivered by e.g. SQL "SELECT" statement, ii. accelerates any subsequent processing, as a properly organized tree of records can be processed faster than a flat stream, iii. decreases network traffic, as redundant data are not sent through the network.

2. Normalizing and merging many flat streams of records into a single stream of record trees (see the concepts of Message Merger and Input Processor):

a. The user models the merging routine—which also immediately defines the normalization routines mentioned above—by graphically mapping the formats of the merged flat streams onto a single tree format where the nodes of the tree format have some scalar components appointed to be both normalization and merging keys.

b. In runtime:

i. information collected in the normalization routines is exploited in the merging routine, ii. every routine—no matter if a normalizing one or a merging one—can run in parallel with the other ones, iii. execution of each normalization routine yields a partial record tree and this partial record tree is sent to the merging routine: such splitting of routines in terms of data they operate on, takes very little inter-thread or inter-process synchronization, which offers very good scalability.

Microgen Aptitude has a consistent external system interface model which is used for all interfaces. The model contains the following elements:

Device—a "transport" layer used to connect and exchange data with the external system. Aptitude contains many classes of devices including e.g.:
 stream devices (e.g. File, IBM MQ and Plug-in device)
 database devices (for Oracle, MS SQL Server, Teradata, Sybase)

External Data Format—a definition of the format of the data used in the external system. Aptitude provides e.g. the following EDFs (it's not a full list):
 Database Table
 Text File
 XML
 SWIFT Message Type In some cases it is possible to use different combinations of the devices and EDFs, e.g. the MQ device may supply messages in the text file format, in the XML format or as a SWIFT messages.

Mapping—defines how the data structure defined by the External Data Format is mapped to the Data Object structure used internally in Aptitude. It is possible to map only a subset of data, to change the attribute names, to calculate expressions while mapping the data etc.

Data Object—the internal Aptitude representation of the data structure in a form convenient to a business user.

The above means that the flat record stream does not have to be defined by the database EDF and supplied using the database device, but it might be e.g. defined by the Text File EDF and supplied using the File Device. In general, any combination of Aptitude device and EDF supplying flat record stream could be used in the Fast Enrichment mapping. This is not implemented currently for the Fast Enrichment but can be implemented in next versions.

Although the invention is shown and described with respect to certain embodiments, it should be clear that modifications will occur to those skilled in the art upon reading and understanding the specification, and the present invention includes all such modifications.

What is claimed is:

1. A method of generating computer instructions for creating instances of a hierarchical data format from a flat record stream, said flat record stream containing data in a flat format and containing at least some data redundancy, the method using a computing device having at least a processor, a memory, a display device and an input device, and the method comprising:
 allowing a developer to use said input device to create a graphical representation of said hierarchical data format;
 allowing a developer to use said input device to create a graphical representation of a mapping between said flat format and said hierarchical format; and
 generating, at said processor, computer instructions which when executed on a computer cause the computer to create from said flat record stream instances of said hierarchical format, and wherein said instances of said hierarchical format remove said data redundancy;
 wherein the method further comprises:
 using at least two independent External Data Format Queries (EDF Queries) to produce said flat record stream, and thereby reduce the data redundancy in said flat record stream compared to using a single External Data Format Query (EDF Query);
 mapping the results of each of said at least two independent EDF Queries to said hierarchical format, and generating computer instructions which when executed on a computer cause the computer to create from said flat record stream instances of at least two separate partial hierarchical formats, each of which forms a part of said hierarchical format; and
 merging said instances of said at least two separate partial hierarchical formats to form instances of said hierarchical data format.

2. A method as claimed in claim 1, which further comprises allowing a developer to define a flat format for said flat record stream.

3. A method as claimed in claim 1, wherein data in said flat format is produced by an external data format, EDF, Query.

4. A method as claimed in claim 3, wherein said EDF Query embeds an SQL statement.

5. A method as claimed in claim 1, which further comprises forming said flat record stream by performing SQL select statements on data stored in a plurality of tables.

6. A method as claimed in claim 1, wherein the creation of said instances of said at least two separate partial hierarchical formats is carried out in parallel.

7. A method as claimed in claim 1, wherein said hierarchical format comprises segments, each of which may comprise a number of attributes.

8. A method as claimed in claim 1, which further comprises displaying on said display a graphical representation of said flat format.

9. A method as claimed in claim 1, wherein said flat record stream comprises of a number of records, each comprising a number of fields, wherein at least one of said fields acts as a key for creating said instances of said hierarchical data format, such that a separate instance of a segment of said hierarchical data format is created for each different value of said key, and wherein the method further comprises automatically grouping or ordering data in at least one of said fields which acts as a key.

10. A method as claimed in claim 1, which further comprises creating a normalization tree which has the same hierarchical format as said hierarchical data format, said normalization tree comprising a number of normalizers each of which is arranged to create instances of a segment of said hierarchical data format.

11. A method as claimed in claim 10, wherein said normalization tree comprises at least one associative normalizer which does not require key data in said flat record stream to be grouped or ordered.

12. A method as claimed in claim 10, wherein said normalization tree comprises at least one triggered normalizer which requires key data in said flat record stream to be grouped or ordered.

13. A method as claimed in claim 10, wherein said normalization tree comprises at least one sequenced normalizer which corresponds with a field of said flat format which is not used as a key, and which is assumed to contain no redundancy, and wherein said sequenced normalizer therefore creates a new instance of a corresponding segment of said hierarchical data format for every record in said flat record stream.

14. A method as claimed in claim 1, wherein said at least two independent EDF Queries are multiple independent EDF Queries.

15. A method as claimed in claim 1, which further comprises allowing multiple independent SQL Select statements to be used in order to avoid extracting redundant data, and then merging the results of the SQL Select statements so as to construct said hierarchical data format.

16. A programmed computer comprising at least a processor, a memory, a display device and an input device, wherein said computer is programmed to perform a method of generating computer instructions for creating instances of a hierarchical data format from a flat record stream, said flat record stream containing at least some data redundancy, the method comprising:
   allowing a developer to use said input device to create a graphical representation of said hierarchical data format;
   allowing a developer to use said input device to create a graphical representation of a mapping between said flat format and said hierarchical format; and
   generating, at said processor, computer instructions which when executed on a computer cause the computer to create from said flat record stream instances of said hierarchical format, and wherein said instances of said hierarchical format remove said data redundancy;
wherein the method further comprises:
   using at least two independent External Data Format Queries (EDF Queries) to produce said flat record stream, and thereby reduce the data redundancy in said flat record stream compared to using a single External Data Format Query (EDF Query);
   mapping the results of each of said at least two independent EDF Queries to said hierarchical format, and generating computer instructions which when executed on a computer cause the computer to create from said flat record stream instances of at least two separate partial hierarchical formats, each of which forms a part of said hierarchical format; and
   merging said instances of said at least two separate partial hierarchical formats to form instances of said hierarchical data format.

17. A non-transitory computer-readable medium containing computer-readable instructions for performing a method of generating computer instructions for creating instances of a hierarchical data format from a flat record stream, said flat record stream containing at least some data redundancy, the method using a computing device having at least a processor, a memory, a display device and an input device, and the method comprising:
   allowing a developer to use said input device to create a graphical representation of said hierarchical data format;
   allowing a developer to use said input device to create a graphical representation of a mapping between said flat format and said hierarchical format; and
   generating, at said processor, computer instructions which when executed on a computer cause the computer to create from said flat record stream instances of said hierarchical format, and wherein said instances of said hierarchical format remove said data redundancy;
wherein the method further comprises:
   using at least two independent External Data Format Queries (EDF Queries) to produce said flat record stream, and thereby reduce the data redundancy in said flat record stream compared to using a single External Data Format Query (EDF Query);
   mapping the results of each of said at least two independent EDF Queries to said hierarchical format, and generating computer instructions which when executed on a computer cause the computer to create from said flat record stream instances of at least two separate partial hierarchical formats, each of which forms a part of said hierarchical format; and
   merging said instances of said at least two separate partial hierarchical formats to form instances of said hierarchical data format.

* * * * *